US011792882B2

United States Patent
Jing et al.

(10) Patent No.: US 11,792,882 B2
(45) Date of Patent: Oct. 17, 2023

(54) CONFIGURATION UPDATE METHOD AND APPARATUS

(71) Applicant: HUAWEI TECHNOLOGIES CO., LTD., Guangdong (CN)

(72) Inventors: Hao Jing, Mougins (FR); Zaifeng Zong, Nanjing (CN); Fenqin Zhu, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/036,547

(22) Filed: Sep. 29, 2020

(65) Prior Publication Data
US 2021/0014929 A1    Jan. 14, 2021

Related U.S. Application Data

(63) Continuation of application No. PCT/CN2019/078250, filed on Mar. 15, 2019.

(30) Foreign Application Priority Data

Mar. 31, 2018   (CN) .......................... 201810278755.6
May 21, 2018   (CN) .......................... 201810491175.5

(51) Int. Cl.
*H04W 76/30*   (2018.01)
*H04W 4/90*   (2018.01)
(Continued)

(52) U.S. Cl.
CPC ............. *H04W 76/30* (2018.02); *H04W 4/90* (2018.02); *H04W 8/02* (2013.01); *H04W 24/02* (2013.01); *H04W 36/0011* (2013.01)

(58) Field of Classification Search
CPC ......... H04W 76/30; H04W 4/90; H04W 8/02; H04W 24/02; H04W 36/0011; H04W 4/50
See application file for complete search history.

(56) References Cited

U.S. PATENT DOCUMENTS 8,665,828 B2    3/2014  Faccin et al.
2016/0374140 A1   12/2016  Li
(Continued)

FOREIGN PATENT DOCUMENTS

CN    101212810 A    7/2008
CN    101335993 A    12/2008
(Continued)

OTHER PUBLICATIONS

3GPP TS 24.501 V1.0.0 (Mar. 2018), "3rd Generation Partnership Project; Technical Specification Group Core Network and Terminals; Non-Access-Stratum (NAS) protocol for 5G System (5GS); Stage 3 (Release 15)," Mar. 2018, 253 pages.
(Continued)

*Primary Examiner* — Marcos L Torres
(74) *Attorney, Agent, or Firm* — Fish & Richardson P.C.

(57) ABSTRACT

Optionally, when the apparatus 1200 is a chip or a circuit, the functions/implementation processes of the receiving unit 1201 and the sending unit 1202 may be alternatively implemented by a pin, a circuit, or the like. Optionally, when the apparatus 1200 is a chip, the memory 1103 may be a storage unit in the chip, for example, a register or a cache. Certainly, when the apparatus 1200 is a mobility management network element, the memory 1103 may be a storage unit that is in the mobility management network element and that is outside a chip. This is not specifically limited in this embodiment of this application.

18 Claims, 15 Drawing Sheets

(51) Int. Cl.
*H04W 8/02* (2009.01)
*H04W 24/02* (2009.01)
*H04W 36/00* (2009.01)

(56) References Cited

U.S. PATENT DOCUMENTS

2019/0306823 A1* 10/2019 Babu .................... H04W 60/04
2021/0136719 A1* 5/2021 Kim ..................... H04W 60/04

FOREIGN PATENT DOCUMENTS

| | | |
|---|---|---|
| CN | 102378113 A | 3/2012 |
| CN | 102769891 A | 11/2012 |
| CN | 104581859 A | 4/2015 |
| CN | 103155637 B | 1/2016 |
| CN | 106031232 A | 10/2016 |
| WO | 2008153474 A1 | 12/2008 |
| WO | 2012024486 A1 | 2/2012 |
| WO | 2017054190 A1 | 4/2017 |

OTHER PUBLICATIONS

Intel et al., "Correction of UE configuration update procedure," 3GPP TSG-SA WG2 Meeting #127, S2-186080, Sanya, China, Apr. 16-20, 2018, 5 pages.

3GPP TS 23.502 V15.1.0 (Mar. 2018), "3rd Generation Partnership Project; Technical Specification Group Services and System Aspects; Procedures for the 5G System; Stage 2 (Release 15)," Mar. 2018, 285 pages.

Extended European Search Report issued in European Application No. 19774839.5 dated Mar. 11, 2021, 14 pages.

Office Action issued in Chinese Application No. 201810491175.5 dated Mar. 17, 2020, 19 pages (with English translation).

Office Action issued in Chinese Application No. 201810491175.5 dated Nov. 11, 2020, 18 pages (with English translation).

Office Action issued in Chinese Application No. 201810491175.5 dated Apr. 2, 2021, 24 pages (with English translation).

PCT International Search Report and Written Opinion issued in International Application No. PCT/CN2019/078250 dated Jun. 18, 2019, 17 pages (with English translation).

Ericsson, "UE configuration update, wait for AMF," 3GPP TSG-CT WG1 Meeting #108, C1-180049, Gothenburg, Sweden, Jan. 22-26, 2018, 5 pages.

EP Communication Pursuant to Article 94(3) EPC in European Appln No. 19774839.5, dated Mar. 15, 2023, 7 pages.

3GPP TS 24.501 V0.3.1 (Feb. 2018), "3rd Generation Partnership Project;Technical Specification Group Core Network and Terminals;Non-Access-Stratum (NAS) protocol for 5G System (5GS);Stage 3(Release 15)," Feb. 2018, 225 pages.

Office Action issued in Chinese Application No. 201810491175.5 dated Aug. 31, 2021, 7 pages.

* cited by examiner

CONFIGURATION UPDATE METHOD AND APPARATUS

CROSS-REFERENCE TO RELATED APPLICATIONS

This application is a continuation of International Application No. PCT/CN2019/078250, filed on Mar. 15, 2019. The International Application claims priority to Chinese Patent Application No. 201810278755.6, filed on Mar. 31, 2018 and Chinese Patent Application No. 201810491175.5, filed on May 21, 2018. All of the afore-mentioned patent applications are hereby incorporated by reference in their entireties.

TECHNICAL FIELD

This application relates to the field of mobile communications technologies, and in particular, to a configuration update method and apparatus.

BACKGROUND

In a 5th generation (5th generation, 5G) communications system and a future communications system, when a mobility management network element needs to update a parameter that is related to access and mobility management and that is in a terminal configuration, the mobility management network element initiates a terminal configuration update procedure. The configuration update procedure may trigger a terminal to perform a registration update procedure after entering an idle mode. Specifically, a signaling connection release procedure is first triggered, and then the terminal is triggered to initiate a registration procedure, so as to complete the configuration update procedure.

The foregoing configuration update procedure has a problem that if the terminal has a service for which service continuity needs to be ensured, the signaling connection release procedure causes interruption of the service.

SUMMARY

This application provides a configuration update method and apparatus, to ensure continuity of a target service in a configuration update procedure of a terminal.

According to a first aspect, this application provides a configuration update method, including: if determining that a configuration of a terminal needs to be updated, determining, by a mobility management network element, whether the terminal has a target service: and if determining that the terminal has the target service, sending, by the mobility management network element, a configuration update message to the terminal, and forgoing, by the mobility management network element, triggering a signaling connection release procedure, where the configuration update message is used to indicate the terminal to perform a configuration update.

In the method, when determining that the configuration of the terminal needs to be updated, the mobility management network element first determines whether the terminal has the target service; and if determining that the terminal has the target service, the mobility management network element sends the configuration update message to the terminal, and forgoes triggering the signaling connection release procedure. This helps avoid interrupting execution of the target service, because the signaling connection release procedure is not triggered. The target service may be a service for which service continuity needs to be ensured, namely, a service that cannot be interrupted. For example, the target service may be an emergency service, a priority service, or a service that is based on an Internet Protocol multimedia subsystem (internet protocol multimedia subsystem, IMS) and that cannot be interrupted.

In a possible implementation, the mobility management network element determines, according to the following method, that the terminal has the target service: determining, by the mobility management network element based on first indication information, that the terminal has the target service, where the first indication information is used to indicate that the terminal has the target service.

In a possible implementation, the mobility management network element sends a first subscription request to a session management network element, where the first subscription request is used to send the first indication information to the mobility management network element when the terminal has the target service.

In the method, the mobility management network element obtains the first indication information by subscribing from the session management network element, where the first indication information is sent by the session management network element to the mobility management network element when the session management network element determines that the terminal has the target service, so that the mobility management network element can determine that the terminal has the target service.

In a possible implementation, the mobility management network element sends a second subscription request to a session management network element, where the second subscription request is used to send a notification to the mobility management network element when the terminal has the target service; and the mobility management network element generates the first indication information based on the received notification.

In the method, the mobility management network element obtains, by subscribing from the session management network element, the notification sent by the session management network element, where the notification is sent by the session management network element to the mobility management network element when the session management network element determines that the terminal has the target service, so that the mobility management network element can generate the first indication information based on the received notification, to subsequently determine that the terminal has the target service.

In a possible implementation, the mobility management network element sends a request message to a session management network element, where the request message is used to request to query whether the terminal has the target service; and the mobility management network element receives a response message from the session management network element, where the response message includes the first indication information.

In the method, the mobility management network element proactively queries, from the session management network element, whether the terminal has the target service, so that the mobility management network element can determine, based on the first indication information included in the received response message, that the terminal has the target service.

In a possible implementation, the mobility management network element may alternatively determine, according to the following method, that the terminal has the target service: receiving, by the mobility management network element, a session establishment request message from the terminal, where the session establishment request message includes second indication information, and the second indication information is used to indicate that an established session is a session of the target service: and determining, by the mobility management network element based on the second indication information, that the terminal has the target service.

In the method, in a session establishment process of the terminal, the mobility management network element may determine, based on the second indication information carried in the session establishment request message, that the terminal has the target service.

In a possible implementation, after the mobility management network element suspends updating the configuration of the terminal, the mobility management network element triggers a procedure of releasing or deactivating a session of a non-target service; or the mobility management network element notifies the session management network element that a session serves only the target service.

For example, when there is only a non-target service in a session, the mobility management network element may trigger the session management network element to release or deactivate the session; or when there are both a target service and a non-target service in a session, the mobility management network element may notify the session management network element that the session serves only the target service, in other words, the session does not serve the non-target service.

In a possible implementation, the mobility management network element sends third indication information to the terminal, where the third indication information is used to indicate the terminal to initiate a registration procedure after a signaling connection is released.

In another possible implementation, the mobility management network element sends fourth indication information to the terminal, where the fourth indication information is used to indicate the terminal to initiate a registration procedure after the target service ends.

In another possible implementation, the sending, by the mobility management network element, a configuration update message to the terminal, and forgoing, by the mobility management network element, triggering a signaling connection release procedure includes: modifying, by the mobility management network element, a target parameter in a configuration update parameter, where the target parameter is a parameter that triggers signaling connection release during the configuration update; and sending, by the mobility management network element to the terminal, the configuration update message carrying a modified configuration update parameter.

In the method, the mobility management network element modifies the target parameter that triggers signaling connection release during the configuration update, and then adds the modified configuration update parameter to the configuration update message, to send the configuration update parameter to the terminal. In this way, after receiving the configuration update parameter, the terminal performs only the configuration update without triggering the registration procedure. This helps avoid a problem that the target service is interrupted because the terminal triggers the registration procedure.

In a possible implementation, if determining that the target service has ended, the mobility management network element triggers re-performing of a configuration update procedure of the terminal. In the method, after the target service ends, the terminal is triggered to re-perform the configuration update procedure, to correctly update a configuration parameter of the terminal.

In a possible implementation, the mobility management network element triggers the signaling connection release procedure if determining that the target service has ended. In the method, when the target service ends, the mobility management network element may trigger signaling connection release, so that the terminal can continue to complete the configuration update procedure after the signaling connection is released.

In a possible implementation, the mobility management network element triggers a procedure of releasing or deactivating a session of a non-target service; or the mobility management network element notifies the session management network element that a session serves the target service.

In a possible implementation, the mobility management network element sends a third subscription request to the session management network element, where the third subscription request is used to notify the mobility management network element when the target service ends.

In another possible implementation, if determining that the session of the target service has been released, the mobility management network element determines that the target service ends.

For example, after determining that the session of the target service is released, the session management network element may proactively report to the mobility management network element, so that the mobility management network element learns that the session of the target service has been released, and further determines that the target service has ended.

In another possible implementation, the mobility management network element may further send fifth indication information to another mobility management network element, where the fifth indication information is used to notify the another mobility management network element that the configuration update of the terminal has not been completed yet, and the another mobility management network element is a mobility management network element that serves the terminal after switching. Based on this solution, if switching between the mobility management network elements occurs, and the terminal switches from the mobility management network element to the another mobility management network element, the mobility management network element may notify the another mobility management network element that the configuration update of the terminal has not been completed yet, so that after execution of the target service is subsequently completed, the another mobility management network element can continue to update the configuration of the terminal. This helps ensure continuity of the target service in the configuration update procedure of the terminal.

In another possible implementation, the fifth indication information is further used to indicate the another mobility management network element to send a fourth subscription request to the session management network element, and the fourth subscription request is used to request to notify the another mobility management network element when the target service ends. In other words, the mobility management network element may further send the fifth indication information to the another mobility management network element, so that the another mobility management network element sends the fourth subscription request to the session management network element.

In another possible implementation, the mobility management network element may further send sixth indication information to the another mobility management network element, where the sixth indication information is used to indicate the another mobility management network element to send a fourth subscription request to the session management network element, and the fourth subscription request is used to request to notify the another mobility management network element when the target service ends. In other words, the mobility management network element ma further send the sixth indication information to the another mobility management network element, so that the another mobility management network element sends the fourth subscription request to the session management network element. Based on this solution, the switched-to another mobility management network element may subscribe to a target service end notification from the session management network element, so that the session management network element can directly notify the another mobility management network element after determining that the target service ends.

According to a second aspect, this application provides a configuration update method, including: if determining that a configuration of a terminal needs to be updated, determining, by a mobility management network element, whether the terminal has a target service; and if determining that the terminal has the target service, suspending, by the mobility management network element, updating the configuration of the terminal.

In the method, when determining that the configuration of the terminal needs to be updated, the mobility management network element first determines whether the terminal has the target service: and if determining that the terminal has the target service, suspends updating the configuration of the terminal. This helps avoid interrupting execution of the target service. The mobility management network element may wait until execution of the target service is completed and then continue to update the configuration of the terminal. This helps ensure continuity of the target service in a configuration update procedure of the terminal. The target service may be a service for which service continuity needs to be ensured, namely, a service that cannot be interrupted. For example, the target service may be an emergency service, a priority service, or an IMS-based service that cannot be interrupted. That the terminal has the target service means that the terminal has a data flow of the target service, has created a protocol data unit (protocol data unit, PDU) session for the target service, or the like.

In a possible implementation, the mobility management network element determines, according to the following method, that the terminal has the target service: determining, by the mobility management network element based on first indication information, that the terminal has the target service, where the first indication information is used to indicate that the terminal has the target service.

In a possible implementation, the mobility management network element sends a first subscription request to a session management network element, where the first subscription request is used to send the first indication information to the mobility management network element when the terminal has the target service.

In the method, the mobility management network element obtains the first indication information by subscribing from the session management network element, where the first indication information is sent by the session management network element to the mobility management network element when the session management network element determines that the terminal has the target service, so that the mobility management network element can determine that the terminal has the target service.

In a possible implementation, the mobility management network element sends a second subscription request to a session management network element, where the second subscription request is used to send a notification to the mobility management network element when the terminal has the target service; and the mobility management network element generates the first indication information based on the received notification.

In the method, the mobility management network element obtains, by subscribing from the session management network element, the notification sent by the session management network element, where the notification is sent by the session management network element to the mobility management network element when the session management network element determines that the terminal has the target service, so that the mobility management network element can generate the first indication information based on the received notification, to subsequently determine that the terminal has the target service.

In a possible implementation, the mobility management network element sends a request message to a session management network element, where the request message is used to request to query whether the terminal has the target service; and the mobility management network element receives a response message from the session management network element, where the response message includes the first indication information.

In the method, the mobility management network element proactively queries, from the session management network element, whether the terminal has the target service, so that the mobility management network element can determine, based on the first indication information included in the received response message, that the terminal has the target service.

In a possible implementation, the mobility management network element receives the first indication information from the session management network element. That is, when the mobility management network element does not send any request to the session management network element, the session management network element sends the first indication information to the mobility management network element if determining that the terminal has the target service. Optionally, the first indication information may be specifically an allocation and retention priority (allocation and retention priority, ARP) and/or a 5G QoS identifier (5G QoS Identifier, 5QI).

In a possible implementation, the mobility management network element receives quality of service information from the session management network element, and then generates the first indication information based on the quality of service information. Optionally, the quality of service information may be an ARP and/or a 5QI.

In a possible implementation, the mobility management network element may alternatively determine, according to the following method, that the terminal has the target service: receiving, by the mobility management network element, a session establishment request message from the terminal, where the session establishment request message includes second indication information, and the second indication information is used to indicate that an established session is a session of the target service: and determining, by the mobility management network element based on the second indication information, that the terminal has the target service.

In the method, in a session establishment process of the terminal, the mobility management network element may determine, by using the second indication information carried in the session establishment request message, that the terminal has the target service.

In a possible implementation, after the mobility management network element suspends updating the configuration of the terminal, the mobility management network element triggers a procedure of releasing or deactivating a session of a non-target service; or the mobility management network element notifies the session management network element that a session serves the target service.

For example, when there is only a non-target service in a session, the mobility management network element may release or deactivate the session; or when there are both a target service and a non-target service in a session, the mobility management network element may notify the session management network element that the session serves only the target service, in other words, the session does not serve the non-target service.

In a possible implementation, after the suspending, by the mobility management network element, updating the configuration of the terminal, the method further includes: if determining that the target service of the terminal has ended, sending, by the mobility management network element, a configuration update message to the terminal, where the configuration update message is used to indicate the terminal to perform a configuration update.

In the method, when determining that the target service has ended, the mobility management network element indicates the terminal to perform the configuration update, so as to complete the configuration update of the terminal without affecting execution of the target service.

In a possible implementation, the mobility management network element sends a third subscription request to the session management network element, where the third subscription request is used to notify the mobility management network element when the target service ends.

In the method, the mobility management network element determines, by using a method of subscription, that the target service has ended, so that the mobility management network element can indicate, in a timely manner when the target service ends, the terminal to complete the configuration update of the terminal.

In another possible implementation, if determining that the session of the target service has been released, the mobility management network element determines that the target service ends.

For example, after determining that the session of the target service is released, the session management network element may proactively report to the mobility management network element, so that the mobility management network element learns that the session of the target service has been released, and further determines that the target service has ended.

In another possible implementation, the mobility management network element may further send fifth indication information to another mobility management network element, where the fifth indication information is used to notify the another mobility management network element that the configuration update of the terminal has not been completed yet, and the another mobility management network element is a mobility management network element that serves the terminal after switching. According to this solution, if switching between the mobility management network elements occurs, and the terminal switches from the mobility management network element to the another mobility management network element, the mobility management network element may notify the another mobility management network element that the configuration update of the terminal has not been completed yet, so that after execution of the target service is subsequently completed, the another mobility management network element can continue to update the configuration of the terminal. This helps ensure continuity of the target service in the configuration update procedure of the terminal.

In another possible implementation, the fifth indication information is further used to indicate the another mobility management network element to send a fourth subscription request to the session management network element, and the fourth subscription request is used to request to notify the another mobility management network element when the target service ends. In other words, the mobility management network element may further send the fifth indication information to the another mobility management network element, so that the another mobility management network element sends the fourth subscription request to the session management network element.

In another possible implementation, the mobility management network element may further send sixth indication information to the another mobility management network element, where the sixth indication information is used to indicate the another mobility management network element to send a fourth subscription request to the session management network element, and the fourth subscription request is used to request to notify the another mobility management network element when the target service ends. In other words, the mobility management network element may further send the sixth indication information to the another mobility management network element, so that the another mobility management network element sends the fourth subscription request to the session management network element. Based on this solution, the switched-to another mobility management network element may subscribe to a target service end notification from the session management network element, so that the session management network element can directly notify the another mobility management network element after determining that the target service ends.

According to a third aspect, this application provides an apparatus. The apparatus may be a mobility management network element, or may be a chip or a circuit. The apparatus has a function for implementing each embodiment of the first aspect. The function may be implemented by hardware, or may be implemented by hardware executing corresponding software. The hardware or software includes one or more modules corresponding to the foregoing function.

According to a fourth aspect, this application provides an apparatus, including a processor and a memory. The memory is configured to store an instruction. When the apparatus runs, the processor executes the instruction stored in the memory, so that the apparatus performs the configuration update method according to any one of the first aspect or the implementations of the first aspect. It should be noted that the memory may be integrated into the processor, or may be independent of the processor.

According to a fifth aspect, this application provides an apparatus. The apparatus includes a processor. The processor is configured to be coupled to a memory, read an instruction in the memory, and perform, according to the instruction, the configuration update method according to any one of the second aspect or the implementation of the second aspect.

According to a sixth aspect, this application provides an apparatus. The apparatus may be a mobility management network element, or may be a chip or a circuit. The apparatus has a function for implementing each embodiment of the second aspect. The function may be implemented by hardware, or may be implemented by hardware executing corresponding software. The hardware or software includes one or more modules corresponding to the foregoing function.

According to a seventh aspect, this application provides an apparatus, including a processor and a memory. The memory is configured to store an instruction. When the apparatus runs, the processor executes the instruction stored in the memory, so that the apparatus performs the configuration update method according to any one of the second aspect or the implementation of the second aspect. It should be noted that the memory may be integrated into the processor, or may be independent of the processor.

According to an eighth aspect, this application provides an apparatus. The apparatus includes a processor. The processor is configured to be coupled to a memory, read an instruction in the memory, and perform, according to the instruction, the configuration update method according to any one of the second aspect or the implementation of the second aspect.

According to a ninth aspect, this application provides a configuration update method, including: if determining that a configuration of a terminal needs to be updated, determining, by a mobility management network element, whether the terminal has a target service: and if determining that the terminal has the target service, sending, by the mobility management network element, a configuration update message to the terminal.

In a possible implementation, the method further includes: the configuration update message includes fourth indication information, and the fourth indication information is used to indicate the terminal to initiate a registration procedure after the target service ends.

The fourth indication information may be carried in the configuration update message to be sent to the terminal, or may be independently sent to the terminal.

In another possible implementation, the configuration update message is used to indicate the terminal to initiate a registration procedure.

According to a tenth aspect, this application provides a configuration update method, including: receiving, by a terminal, a configuration update message from a mobility management network element; and initiating, by the terminal, a registration procedure after a target service ends.

In the method, after receiving the configuration update message, the terminal initiates the registration procedure after the target service ends, and therefore normal execution of the target service is not affected. This helps ensure continuity of the target service.

In a possible implementation, the method further includes: determining, by the terminal, that the target service ends. Optionally, the determining, by the terminal, that the target service ends specifically includes: determining, by the terminal based on that a session corresponding to the target service is released or an application corresponding to the target service has been closed, that the target service has ended.

In a possible implementation, the method further includes: receiving, by the terminal, fourth indication information from the mobility management network element, where the fourth indication information is used to indicate the terminal to initiate the registration procedure after the target service ends.

The fourth indication information may be carried in the configuration update message to be sent to the terminal, or may be independently sent to the terminal.

In a possible implementation, the method further includes: updating, by the terminal, a configuration of the terminal based on the configuration update message.

According to an eleventh aspect, this application provides an apparatus. The apparatus may be a mobility management network element, or may be a chip or a circuit. The apparatus has a function for implementing each embodiment of the ninth aspect. The function may be implemented by hardware, or may be implemented by hardware executing corresponding software. The hardware or software includes one or more modules corresponding to the foregoing function.

According to a twelfth aspect, this application provides an apparatus, including a processor and a memory. The memory is configured to store an instruction. When the apparatus runs, the processor executes the instruction stored in the memory, so that the apparatus performs the configuration update method according to the ninth aspect. It should be noted that the memory may be integrated into the processor, or may be independent of the processor.

According to a thirteenth aspect, this application provides an apparatus. The apparatus includes a processor. The processor is configured to be coupled to a memory, read an instruction in the memory, and perform, according to the instruction, the configuration update method according to the ninth aspect.

According to a fourteenth aspect, this application provides an apparatus. The apparatus may be a terminal, or may be a chip or a circuit. The apparatus has a function for implementing each embodiment of the tenth aspect. The function may be implemented by hardware, or may be implemented by hardware executing corresponding software. The hardware or software includes one or more modules corresponding to the foregoing function.

According to a fifteenth aspect, this application provides an apparatus, including a processor and a memory. The memory is configured to store an instruction. When the apparatus runs, the processor executes the instruction stored in the memory, so that the apparatus performs the configuration update method according to any one of the tenth aspect or the implementation of the tenth aspect. It should be noted that the memory may be integrated into the processor, or may be independent of the processor.

According to a sixteenth aspect, this application provides an apparatus. The apparatus includes a processor. The processor is configured to be coupled to a memory, read an instruction in the memory, and perform, according to the instruction, the configuration update method according to any one of the tenth aspect or the implementation of the tenth aspect.

According to a seventeenth aspect, this application provides a configuration update method, including: receiving, by a terminal, a configuration update message from a mobility management network element; and initiating, by the terminal, a registration procedure after a signaling connection is released.

In the method, after receiving the configuration update message, the terminal initiates the registration procedure after the signaling connection is released, and therefore normal execution of a target service is not affected. This helps ensure continuity of the target service.

In an implementation, the terminal initiates the registration procedure if determining that the signaling connection is released.

In a possible implementation, the method further includes: receiving, by the terminal, third indication information from the mobility management network element, where the third indication information is used to indicate the terminal to initiate the registration procedure after the signaling connection is released.

The third indication information may be carried in the configuration update message to be sent to the terminal, or may be independently sent to the terminal.

In a possible implementation, the method further includes: updating, by the terminal, a configuration of the terminal based on the configuration update message.

In another possible implementation, the configuration update message carries a modified configuration update parameter, where the modified configuration update parameter includes a modified target parameter, and the target parameter is a parameter that triggers signaling connection release during a configuration update.

According to an eighteenth aspect, this application provides an apparatus. The apparatus may be a terminal, or may be a chip or a circuit. The apparatus has a function for implementing each embodiment of the seventeenth aspect. The function may be implemented by hardware, or may be implemented by hardware executing corresponding software. The hardware or software includes one or more modules corresponding to the foregoing function.

According to a nineteenth aspect, this application provides an apparatus, including a processor and a memory. The memory is configured to store an instruction. When the apparatus runs, the processor executes the instruction stored in the memory, so that the apparatus performs the configuration update method according to any one of the seventeenth aspect or the implementation of the seventeenth aspect. It should be noted that the memory may be integrated into the processor, or may be independent of the processor.

According to a twentieth aspect, this application provides an apparatus. The apparatus includes a processor. The processor is configured to be coupled to a memory, read an instruction in the memory, and perform, according to the instruction, the configuration update method according to any one of the seventeenth aspect or the implementation of the seventeenth aspect.

According to a twenty-first aspect, this application further provides a computer readable storage medium. The computer readable storage medium stores a program or an instruction. When the program or the instruction runs on a computer, the computer is enabled to perform the methods according to the foregoing aspects.

According to a twenty-second aspect, this application further provides a computer program product including an instruction. When the instruction runs on a computer, the computer is enabled to perform the methods according to the foregoing aspects.

According to a twenty-third aspect, this application further provides a system. The system includes a mobility management network element. The mobility management network element may be configured to perform the steps performed by the mobility management network element in the method according to any one of the first aspect or the implementations of the first aspect. In a possible design, the system may further include a session management network element. The session management network element may be configured to perform the steps performed by the session management network element in the method according to any one of the first aspect or the implementations of the first aspect, or in the solutions provided in the embodiments of the present invention. In a possible design, the system may further include another device that is in the solutions provided in the embodiments of the present invention and that interacts with the mobility management network element and/or the session management network element, for example, a terminal device.

According to a twenty-fourth aspect, this application further provides a system. The system includes a mobility management network element. The mobility management network element may be configured to perform the steps performed by the mobility management network element in the method according to any one of the second aspect or the implementations of the second aspect. In a possible design, the system may further include a session management network element. The session management network element may be configured to perform the steps performed by the session management network element in the method according to any one of the second aspect or the implementations of the second aspect, or in the solutions provided in the embodiments of the present invention. In a possible design, the system may further include another device that is in the solutions provided in the embodiments of the present invention and that interacts with the mobility management network element and/or the session management network element, for example, a terminal device.

These aspects or other aspects of this application are clearer and more comprehensible in descriptions of the following embodiments.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated, "a plurality of" indicates at least two.

Network architectures and service scenarios described in the embodiments of this application are intended to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application are also applicable to a similar technical problem.

Figure 1:
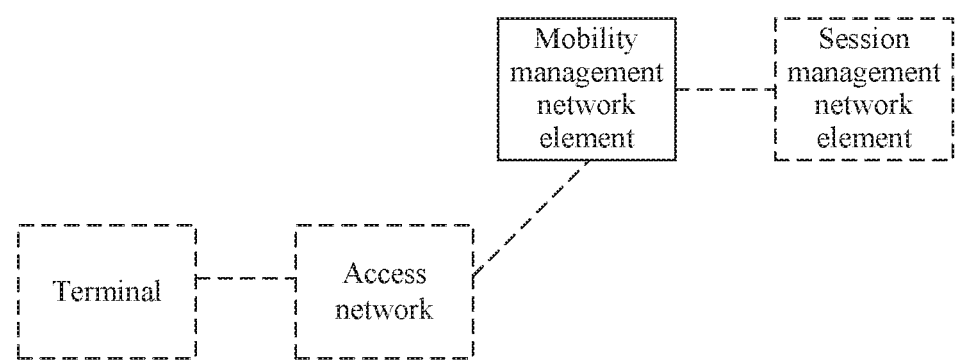
FIG. 1 is a schematic diagram of a possible network architecture according to this application.

FIG. 1 shows a possible network architecture to which this application is applicable. The network architecture includes a mobility management network element, and optionally, may further include a session management network element, and may further include a terminal.

The terminal accesses a core network through an access network (for example, by using a radio access network (radio access network, RAN) device). The core network includes a control-plane network element and a user-plane network element. For example, the control-plane network element includes a mobility management network element, and may further include a session management network element and the like.

The mobility management network element is mainly used for mobility management, for example, a user location update, network registration of a user, or user handover, in a mobile network. In 5G, a mobility management network element may be an access and mobility management function (access and mobility management function, AMF) network element, and in future communications such as 6th generation (6th generation, 6G), a mobility management network element may still be an AMF network element or may have another name. This is not limited in this application.

The session management network element is mainly used for session management, for example, session establishment, modification, or release, in the mobile network. Specific functions are, for example, allocating an internet protocol (internet protocol, IP) address to a user, and selecting a user-plane function network element that provides a packet forwarding function. In 5G, a session management network element may be a session management function (session management function, SMF) network element, and in future communications such as 6G, a session management network element may still be an SMF network element or may have another name. This is not limited in this application.

The terminal may communicate with the mobility management network element in the foregoing network architecture by using a non-access stratum (non access stratum, NAS) message. In an implementation, the terminal may forward a NAS message to the mobility management network element by using a RAN device, and receive a NAS message from the mobility management network element by using the RAN device.

In this embodiment of this application, the terminal is a device with a wireless communication function; and may be deployed on land, including indoor or outdoor and in a handheld form or an in-vehicle form, may be deployed on water (for example, on a ship), or may be deployed in the air (for example, on an airplane, a balloon, or a satellite). The terminal may be a mobile phone (mobile phone), a pad (pad), a computer with a radio sending and receiving function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like; or may be user equipments (user equipment, UE), mobile stations (mobile station, MS), or terminal devices (terminal device) in various forms.

The RAN device, also referred to as a base station, is a device that provides a wireless communication function for the terminal, and includes but is not limited to: a next generation NodeB (next generation node B, gNB) in 5G, a radio network controller (radio network controller, RNC), a NodeB (node B, NB), a base station controller (base station controller, BSC), a base transceiver station (base transceiver station, BTS), a home base station (for example, a home evolved nodeB, or a home node B, HNB), a baseband unit (baseband unit, BBU), a transmitting and receiving point (transmitting and receiving point, TRP), a transmitting point (transmitting point, TP), a mobile switching center, and the like. Alternatively, the base station in this application may be a device that provides a wireless communication function for a terminal in another communications system that may appear in the future.

It may be understood that functions of the foregoing network elements may be implemented by network elements in a hardware device, software functions running on dedicated hardware, or virtualized functions instantiated on a platform (for example, a cloud platform).

For ease of description, the following describes this application by using an example in which a session management network element is an SMF network element and a mobility management network element is an AMF network element. In addition, for ease of description, further, the SMF network element and the AMF network element are respectively referred to as an SMF and an AMF for short.

The following describes a configuration update method provided in this application, with reference to the network architecture shown in FIG. 1. The method may be used to resolve a problem that exists in the prior art.

Figure 2:
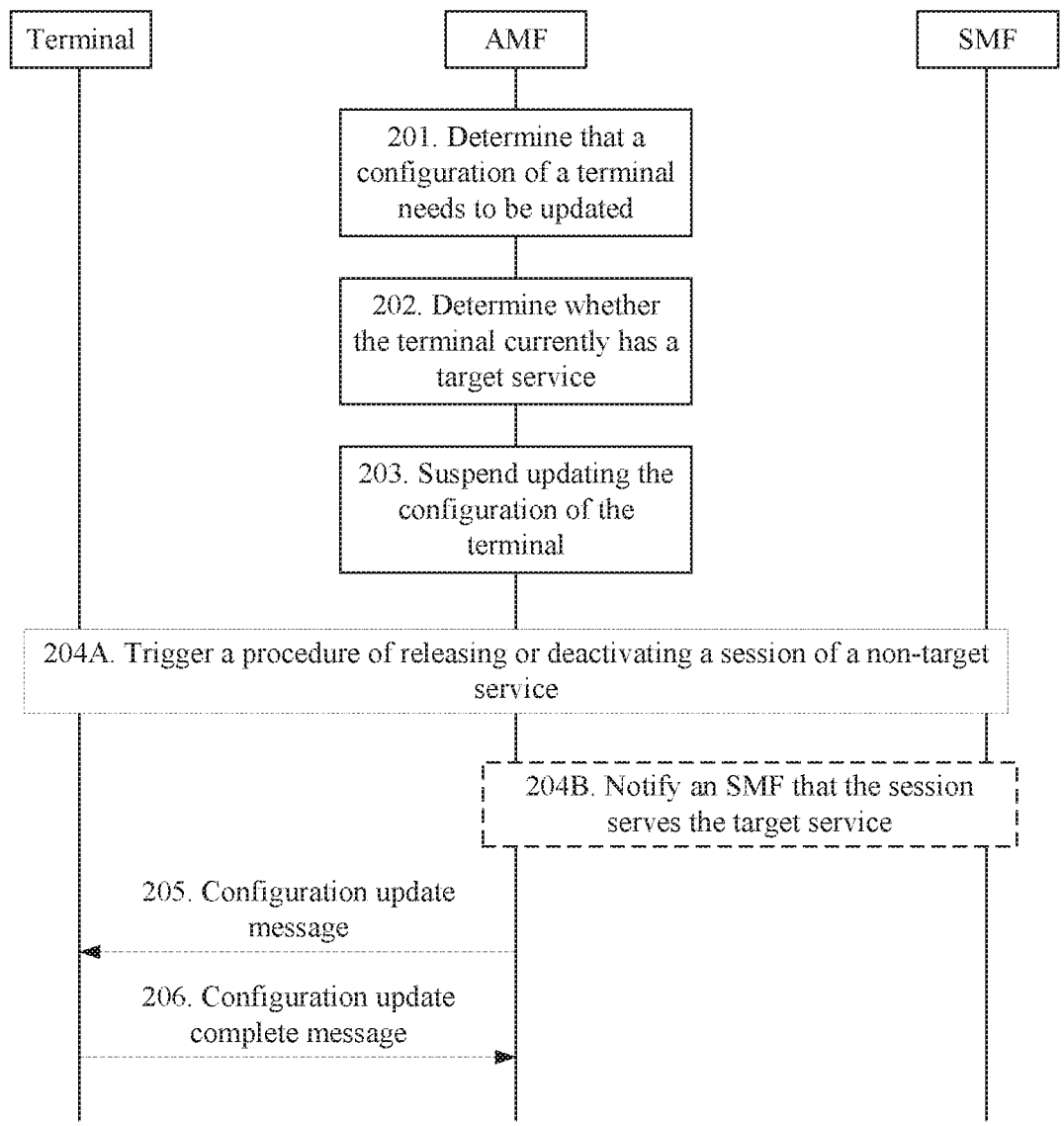
FIG. 2 is a flowchart of a configuration update method according to this application.

FIG. 2 shows a configuration update method provided in this application. An AMF in the method may be the mobility management network element shown in FIG. 1. An SMF in the method may be the session management network element shown in FIG. 1. A terminal in the method may be the terminal shown in FIG. 1. The method includes the following steps.

Step 201: The AMF determines that a configuration of the terminal needs to be updated.

For example, a method for determining, by the AMF, that the configuration of the terminal needs to be updated may be as follows: The AMF needs to change a parameter that is related to access and mobility management and that is in the configuration of the terminal, for example, a unified data management (unified data management, UDM) network element notifies the AMF that subscription information of the terminal needs to be updated, or a network slice configuration changes.

Step 202: The AMF determines whether the terminal has a target service.

When determining that the configuration of the terminal needs to be updated, the AMF further determines whether the terminal has the target service. The target service may be a service for which service continuity needs to be ensured, namely, a service that cannot be interrupted. For example, the target service may be an emergency service, a high-priority service, or an IMS-based service that cannot be interrupted. That the terminal has the target service means that the terminal has a data flow of the target service, has created a protocol data unit (protocol data unit, PDU) session for the target service, or the like.

Step 203: If determining that the terminal has the target service, the AMF suspends updating the configuration of the terminal.

For example, that the AMF suspends updating the configuration of the terminal may be as follows: The AMF does not send to the terminal, any configuration update message used to trigger or indicate the terminal to update the configuration, so that the terminal receives no configuration update message and does not trigger a configuration update procedure.

In the foregoing embodiment, when determining that the configuration of the terminal needs to be updated, the AMF first determines whether the terminal has the target service; and if determining that the terminal has the target service, suspends updating the configuration of the terminal. This helps avoid interrupting execution of the target service. The AMF may wait until execution of the target service is completed and then continue to update the configuration of the terminal. This helps ensure continuity of the target service in a configuration update procedure of the terminal.

After step 202, if determining that the terminal has no target service, the AMF may send a configuration update message to the terminal according to a method in the prior art, to trigger the terminal to perform a configuration update procedure. For a specific method, refer to the prior art. Details are not described herein.

The following specifically describes a method for determining, by the AMF, whether the terminal has a target service in step 202.

Method A: The AMF determines, based on first indication information, that the terminal has the target service, where the first indication information is used to indicate that the terminal has the target service.

In other words, after obtaining the first indication information, the AMF may determine that the terminal has the target service. Methods for obtaining the first indication information by the AMF may specifically include but are not limited to the following five methods.

Method 1: The AMF sends a first subscription request to the SMF, where the first subscription request is used to send the first indication information to the AMF when the terminal has the target service.

In an implementation, when the terminal has the target service, the SMF sends the first indication information to the AMF. The first indication information may include quality of service (Quality of Service, QoS) information. The QoS information includes an allocation and retention priority (allocation and retention priority, ARP), or the QoS information includes a 5G QoS identifier (5G QoS Identifier, 5QI), or the QoS information includes an ARP and a 5QI. Certainly, the QoS information may alternatively include other information.

The ARP includes information such as a priority level, a pre-emption capability (pre-emption capability), and a pre-emption vulnerability (pre-emption vulnerability). The priority level defines relative importance of a resource request, so that when resources are limited, whether a new QoS flow should be accepted or rejected can be determined. A priority range of the ARP is from 1 to 15, and 1 indicates a highest priority. The pre-emption capability defines whether a data flow with a higher priority can pre-empt a resource of an existing data flow with a lower priority. The pre-emption vulnerability defines whether a data flow may lose a resource allocated to the data flow, to allow a data flow with a higher priority to use the resource. Therefore, when the ARP includes a high priority level and/or includes a high pre-emption capability, a value of the ARP may be used to indicate the target service. The target service is a service for which service continuity needs to be ensured, namely, a service that cannot be interrupted. For example, the target service may be an emergency service, a high-priority service, or an IMS-based service that cannot be interrupted. A value of the 5QI may represent different QoS features, for example, a priority, a data packet delay, and a data packet error rate. Therefore, when the 5QI includes a high priority level, and/or a low data packet delay, and/or a low data packet error rate, the value of the 5QI may be used to indicate the target service.

Therefore, the AMF may determine, based on the QoS information, that the target service exists. Specifically, the AMF may determine, based on the ARP and/or the 5QI included in the QoS information, that the target service exists.

For example, with reference to FIG. 2, before step 202, the method further includes the following step: The AMF sends the first subscription request to the SMF, where the first subscription request is used to send the first indication information to the AMF when the terminal has the target service. This step may be performed before step 201, or may be performed after step 201 and before step 202.

Therefore, before step 202, if determining that the terminal has the target service, the SMF sends the first indication information to the AMF, so that the AMF can obtain the first indication information. Further, in step 202, the AMF may determine, based on the first indication information, that the terminal has the target service.

Method 2: The AMF sends a second subscription request to the SMF, where the second subscription request is used to send a notification to the AMF when the terminal has the target service: and the AMF generates the first indication information based on the received notification.

In an implementation, when the terminal has the target service, the SMF sends the notification to the AMF. The notification may include QoS information. The QoS information includes an ARP and/or a 5QI. A value of the ARP may be used to indicate the target service. The 5QI may be used to indicate the target service. For details, refer to the related descriptions in the foregoing method 1.

Therefore, the AMF may determine, based on the QoS information, that the target service exists, and may further generate the first indication information.

For example, with reference to FIG. 2, before step 202, the method further includes the following step: The AMF sends the second subscription request to the SMF, where the second subscription request is used to send the notification to the AMF when the terminal has the target service. This step may be performed before step 201, or may be performed after step 201 and before step 202.

Therefore, before step 202, if determining that the terminal has the target service, the SMF sends the notification to the AMF, and the AMF generates the first indication information based on the received notification. Further, in step 202, the AMF may determine, based on the first indication information, that the terminal has the target service.

In an implementation, for example, the notification sent when the SMF determines that the terminal has the target service may include identification information of a service, and indication information used to indicate that a type of the service is the target service. Further, the AMF generates the first indication information based on the notification, and stores the first indication information locally.

Method 3: The AMF sends a request message to the SMF, where the request message is used to request to query whether the terminal has the target service; and the AMF receives a response message from the SMF, where the response message includes the first indication information.

For example, with reference to FIG. 2, before step 202, the method further includes the following step: The AMF sends the request message to the SMF, where the request message is used to request to query whether the terminal has the target service. The AMF receives the response message from the AMF, where the response message includes the first indication information.

In an implementation, when the terminal has the target service, the SMF sends the response message to the AMF. The response message includes the first indication information. The first indication information may include QoS information. The QoS information includes an ARP and/or a 5QI. A value of the ARP may be used to indicate the target service. The 5QI may be used to indicate the target service. For details, refer to the related descriptions in the foregoing method 1.

Therefore, the AMF may determine, based on the QoS information, that the target service exists, and may further generate the first indication information.

In the method, the AMF proactively sends the request message to the SMF, to query whether the terminal has the target service. If finding that the terminal has the target service, the SMF sends the first indication information to the AMF. Further, in step 202, the AMF may determine, based on the first indication information, that the terminal has the target service.

Method 4: The SMF sends the first indication information to the AMF.

In the method, the SMF sends the first indication information to the AMF when determining that the terminal has the target service, without using a query request or a subscription request of the AMF as a basis. The first indication information is used to indicate that the terminal has the target service, and the AMF may store the first indication information. For example, a manner of learning, by the SMF, that the terminal has the target service includes: determining, by the SMF based on an ARP and/or a 5QI corresponding to a QoS flow in a PDU session, that the PDU session is a PDU session including the target service.

In an implementation, the first indication information sent by the SMF to the AMF may be one-bit indication information. Therefore, the AMF may determine, based on the first indication information, that the terminal has the target service. The AMF may store the one-bit indication information correlated with a PDU session, or store an indication indicating that the target service exists, so that the AMF can determine, based on the indication information in another subsequent related procedure, that the target service exists. In another implementation, the first indication information sent by the SMF to the AMF includes QoS information. The AMF stores the first indication information. The QoS information includes an ARP and/or a 5QI. A value of the ARP may be used to indicate the target service. The 5QI may be used to indicate the target service. For details, refer to the related descriptions in the foregoing method 1. Therefore, the AMF may determine, based on the ARP and/or the 5QI in the first indication information, that the terminal has the target service. Alternatively, the AMF may first store the first indication information after receiving the first indication information. When the AMF subsequently needs to determine whether the terminal has the target service, the AMF may determine, based on the ARP and/or the 5QI in the stored first indication information, that the terminal has the target service.

Method 5: The SMF sends QoS information to the AMF, and the AMF generates the first indication information based on the QoS information. The AMF may store the QoS information, or store the first indication information generated based on the QoS information.

In the method, the SMF does not need to determine whether the terminal has the target service, but sends the QoS information of a service to the AMF, so that the AMF determines whether the target service exists. The AMF may store the QoS information, or store the first indication information generated based on the QoS information. The QoS information includes an ARP and/or a 5QI.

A service indicated by a value of the ARP herein may be the target service or a non-target service. A service indicated by the 5QI herein may be the target service or a non-target service. For example, when the value of the ARP indicates a high priority or a high pre-emption capability, the service indicated by the value of the ARP is the target service; or when the value of the ARP indicates a low priority or a low pre-emption capability, the service indicated by the value of the ARP is a non-target service (also referred to as a common service). Likewise, when the value of the 5QI indicates a high priority, and/or a low data packet delay, and/or a low data packet error rate, the service indicated by the value of the 5QI is the target service; or when the value of the 5QI indicates a low priority, and/or a high data packet delay, and/or a high data packet error rate, the service indicated by the value of the 5QI is a non-target service.

After receiving the QoS information sent by the SMF the AMF may determine, based on the ARP and/or the 5QI in the QoS information, whether the target service exists. If determining that the target service exists, the AMF may further generate the first indication information. It should be noted that the AMF may store the QoS information, and determine, in a subsequent procedure, whether the target service exists. Alternatively, after receiving the QoS information, the AMF determines, based on the ARP and/or the 5QI in the QoS information, whether the terminal has the target service. If determining that the terminal has the target service, the AMF may further generate the first indication information, and store the first indication information. The first indication information may be used to determine, in another subsequent related procedure, whether the terminal has the target service.

When the QoS information sent by the SMF includes the ARP, and the value of the ARP indicates a high priority or a high pre-emption capability, the AMF may determine that the service indicated by the value of the ARP is the target service, and the AMF may further determine that the terminal has the target service.

When the QoS information sent by the SMF includes the 5QI, and the 5QI is used to indicate a high priority, and/or a low data packet delay, and/or a low data packet error rate, the AMF may determine that the service indicated by the value of the 5QI is the target service, and the AMF may further determine that the terminal has the target service.

When the QoS information sent by the SMF includes the ARP and the 5QI, and the value of the ARP indicates a high priority or a high pre-emption capability, or the 5QI is used to indicate a high priority, and/or a low data packet delay, and/or a low data packet error rate, the AMF may determine, based on the value of the ARP, that the terminal has the target service; or the AMF may determine, based on the value of the 5QI, that the terminal has the target service; or the AMF may determine, based on the value of the ARP and the value of the 5QI, that the terminal has the target service.

Method B: The AMF receives a session establishment request message from the terminal, where the session establishment request message includes second indication information, and the second indication information is used to indicate that an established session is a session of the target service. The AMF determines, based on the second indication information, that the terminal has the target service.

In the method B, in a process of initiating a session establishment request by the terminal, the AMF determines whether a session that the terminal request to establish is the session of the target service, so as to determine whether the terminal has the target service.

In a specific implementation, the session establishment request message sent by the terminal to the AMF includes a request type. The request type is used to indicate that the session requested to be established is the session of the target service. The target service may be an emergency service, a priority service, or the like. Therefore, the AMF may determine, based on the request type, that the session that the terminal requests to establish is the session of the target service, and further determine that the terminal has the target service. The request type is a specific implementation of the second indication information.

It should be noted that the step of sending, by the terminal, the session establishment request message to the AMF may be performed before step 202 shown in FIG. 2. For example, the step may be performed before step 201, or may be performed after step 201 and before step 202.

Further, after step 203, the method may further include the following step 204A and/or step 204B.

Step 204A: The AMF triggers a procedure of releasing or deactivating a session of a non-target service.

For a non-target service of the terminal, that is, a service for which service continuity does not need to be ensured, for example, a non-emergency service or a non-priority task, the AMF may release or deactivate a session of the non-target service.

Because the non-target service has ended in advance, once the target service ends, a signaling connection release procedure can be quickly completed, so that the terminal enters an idle mode. Signaling connection release may include access network (access network, AN) release, NAS signaling connection release, or the like.

It should be noted that the session of the non-target service is a session including only the non-target service. Because the session includes only the non-target service, the session may be directly released or deactivated. However, a session including both a target service and a non-target service cannot be directly released; instead, the non-target service may be ended by performing the following step 204B.

Step 204B: The AMF notifies the SMF that the session serves only the target service.

For example, a session A includes both a target service a and a non-target service b. In this case, the AMF may notify the SMF that the session A serves the target service a. That is, the AMF notifies the SMF that the session A serves only the target service a, and does not serve the non-target service b. Therefore, after receiving a notification from the AMF, the SMF no longer serves the non-target service b. This may be understood as that the SMF ends the non-target service b.

Because the non-target service has ended in advance, once the target service ends, the signaling connection release procedure can be quickly completed, so that the terminal enters the idle mode.

It should be noted that because step 204A and step 204B are operations performed for different types of sessions, there is no necessary correlation between step 204A and step 204B. To be specific, only step 204A may be performed, or only step 204B may be performed, or both step 204A and step 204B may be performed.

Further, after step 203 or step 204A or step 204B, the method further includes the following step 205.

Step 205: If determining that the target service of the terminal has ended, the AMF sends a configuration update message to the terminal, where the configuration update message is used to indicate the terminal to perform a configuration update. Correspondingly, the terminal receives the configuration update message.

To be specific, when determining that the target service of the terminal has ended, the AMF determines that the configuration update of the terminal may continue to be performed, and therefore sends the configuration update message to the terminal, where the configuration update message is used to indicate the terminal to perform the configuration update.

After receiving the configuration update message, the terminal may perform a terminal configuration process according to a procedure in the prior art. Specifically, the AMF triggers a signaling connection release procedure. Further, the terminal initiates a registration procedure to complete the configuration update. The terminal has no ongoing target service in a configuration update process. This helps avoid interrupting execution of the target service.

In an implementation, the AMF may determine, by performing the following step, that the target service of the terminal has ended: The AMF sends a third subscription request to the SMF, where the third subscription request is used to notify the AMF when the target service ends.

It should be noted that this step may be performed in any step before step 205.

Alternatively, this step and the foregoing step of sending the first subscription request by the AMF may be combined into one step, that is, the AMF further sends the third subscription request while sending the first subscription request; or the first subscription request and the third subscription request are combined into one subscription request, where the subscription request may implement functions of both the first subscription request and the third subscription request.

Alternatively, this step and the foregoing step of sending the second subscription request by the AMF may be combined into one step, that is, the AMF further sends the third subscription request while sending the second subscription request; or the second subscription request and the third subscription request are combined into one subscription request, where the subscription request may implement functions of both the second subscription request and the third subscription request.

Therefore, when receiving a target service end notification reported by the SMF, the AMF may determine, in a manner of subscription, that the target service has ended.

Further, after step 205, the method may further include the following step 206.

Step 206: The terminal sends a configuration update complete message to the AMF. Correspondingly, the AMF receives the configuration update complete message.

When completing the configuration update, the terminal may send the configuration update complete message to notify the AMF that the configuration update has been completed.

With reference to FIG. 3 to FIG. 6, the following specifically describes different implementations of the embodiment shown in FIG. 2.

Figure 3:
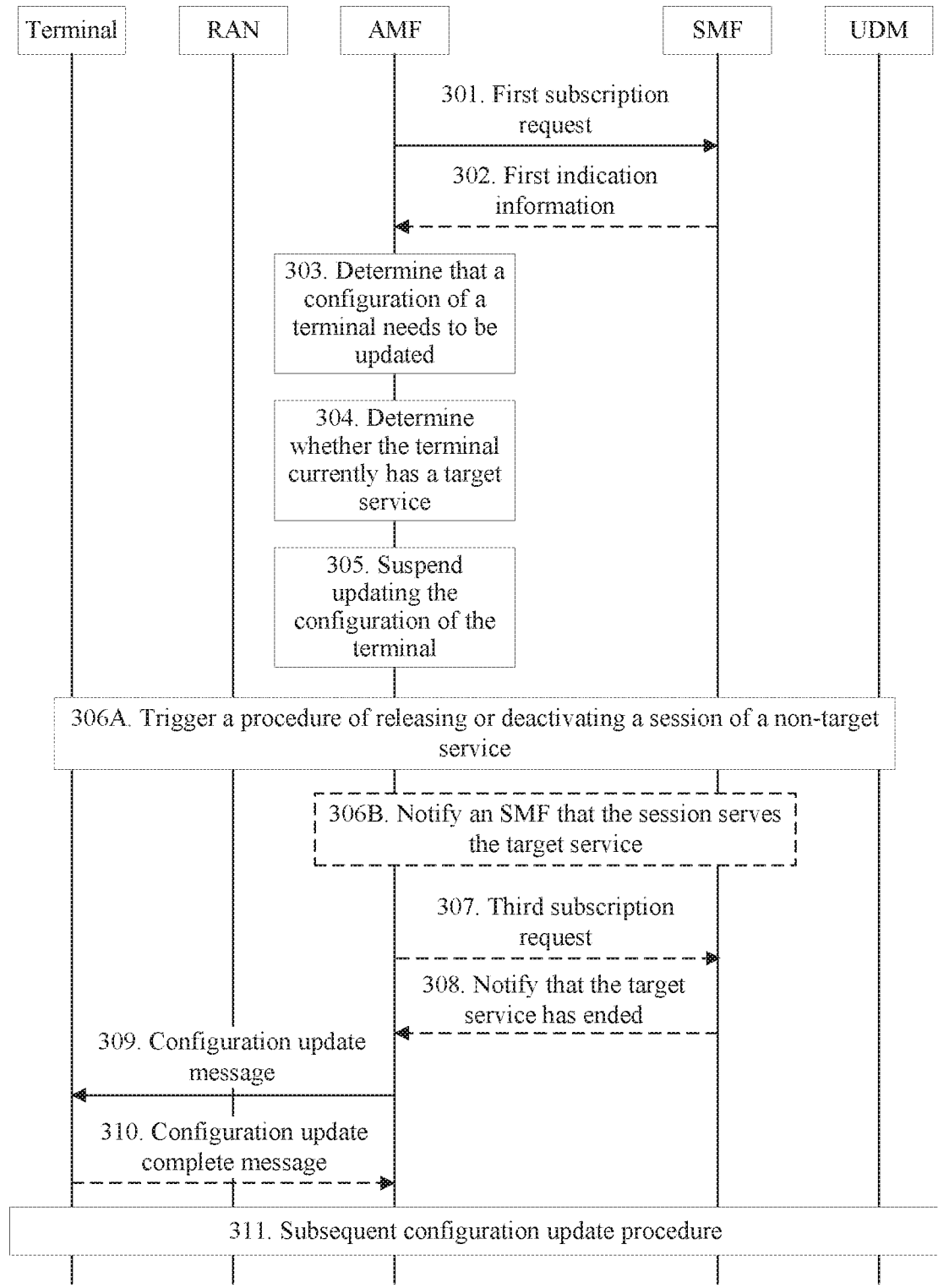
FIG. 3 is a flowchart of another configuration update method according to this application.

FIG. 3 shows a configuration update method provided in this application. The method includes the following steps.

Step 301: An AMF sends a first subscription request to an SMF. Correspondingly, the SMF receives the first subscription request.

The AMF sends the first subscription request to the SMF. The first subscription request is used to send first indication information to the AMF when a terminal has a target service.

Step 302: The SMF sends the first indication information to the AMF.

Correspondingly, the AMF receives the first indication information.

This step is an optional step. The SMF sends the first indication information to the AMF only when determining that the terminal has the target service.

Step 303 to step 306B are the same as step 201 to step 204B in the embodiment shown in FIG. 2. Refer to the foregoing descriptions.

It should be noted that step 301 and step 302 may be alternatively performed after step 303 and before step 304. This is not limited in this application.

Step 307: The AMF sends a third subscription request to the SMF.

Correspondingly, the SMF receives the third subscription request.

The third subscription request is used to notify the AMF when the target service of the terminal ends.

It should be noted that step 307 may be performed in any step before step 308. Alternatively, step 307 and step 301 may be combined into one step. For example, in step 301, the first subscription request and the third subscription request are simultaneously sent. Alternatively, the third subscription request in step 307 and the first subscription request in step 301 are combined into one subscription request. For example, in step 301, only one subscription request is sent, where the subscription request has functions of the first subscription request and the third subscription request.

Step 308: If determining that the target service has ended, the SMF notifies the AMF that the target service has ended.

It should be noted that step 308 may be alternatively performed after step 305 and before step 306A, or may be performed after step 306A and before step 306B. This is not limited in this application.

Step 309 and step 310 are the same as step 205 and step 206 in the embodiment shown in FIG. 2. Refer to the foregoing descriptions.

Step 311: Perform a subsequent configuration update procedure.

Refer to a related procedure in the prior art. For example, refer to 3GPP TS 23.502: "Procedures for the 5G System; Stage 2". Details are not described herein.

Figure 4:
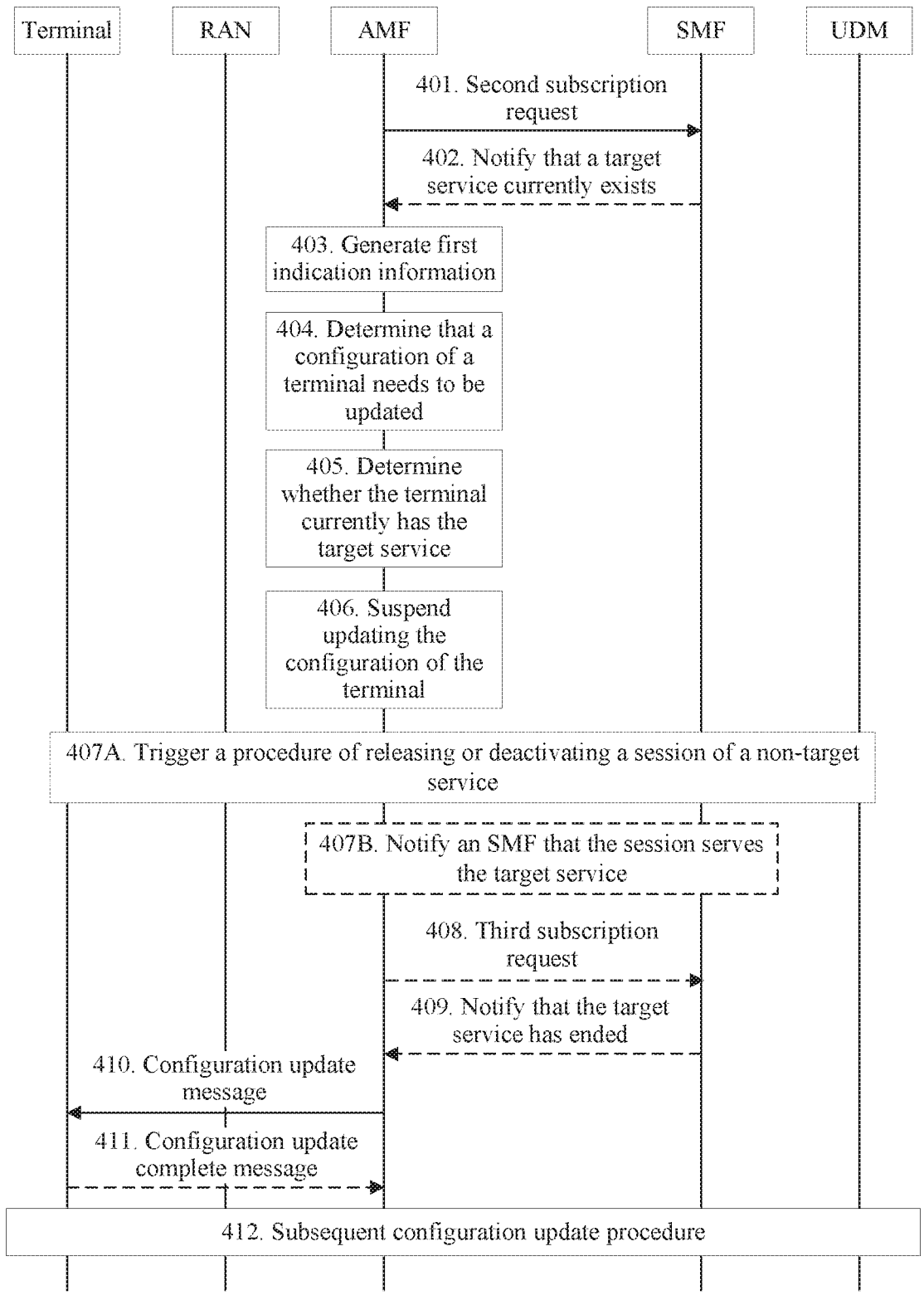
FIG. 4 is a flowchart of another configuration update method according to this application.

FIG. 4 shows a configuration update method provided in this application. The method includes the following steps.

Step 401: An AMF sends a second subscription request to an SMF. Correspondingly, the SMF receives the second subscription request.

The AMF sends the second subscription request to the SMF. The second subscription request is used to send a notification to the AMF when a terminal has a target service.

Step 402: The SMF sends a notification message to the AMF, to notify the AMF that the terminal has the target service.

This step is an optional step. The SMF sends the notification to the AMF only when determining that the terminal has the target service.

Step 403: The AMF generates first indication information.

After generating the first indication information, the AMF stores the first indication information locally. Subsequently, the AMF may determine, based on the locally stored first indication information, that the terminal has the target service.

Step 404 to step 407B are the same as step 201 to step 204B in the embodiment shown in FIG. 2. Refer to the foregoing descriptions.

It should be noted that step 401 and step 403 may be alternatively performed after step 404 and before step 405. This is not limited in this application.

Step 408: The AMF sends a third subscription request to the SMF. Correspondingly, the SMF receives the third subscription request.

The third subscription request is used to notify the AMF when the target service ends.

It should be noted that step 408 may be performed in any step before step 409. Alternatively, step 408 and step 401 may be combined into one step. For example, in step 401, the second subscription request and the third subscription request are simultaneously sent. Alternatively, the third subscription request in step 408 and the second subscription request in step 401 are combined into one subscription request. For example, in step 401, only one subscription request is sent, where the subscription request has functions of the second subscription request and the third subscription request.

Step 409: If determining that the target service has ended, the SMF notifies the AMF that the target service has ended.

It should be noted that step 409 may be alternatively performed after step 406 and before step 407A, or may be performed after step 407A and before step 407B. This is not limited in this application.

Step 410 and step 411 are the same as step 205 and step 206 in the embodiment shown in FIG. 2. Refer to the foregoing descriptions.

Step 412: Perform a subsequent configuration update procedure.

Refer to a related procedure in the prior art. For example, refer to 3GPP TS 23.502: "Procedures for the 5G System; Stage 2". Details are not described herein.

Figure 5:
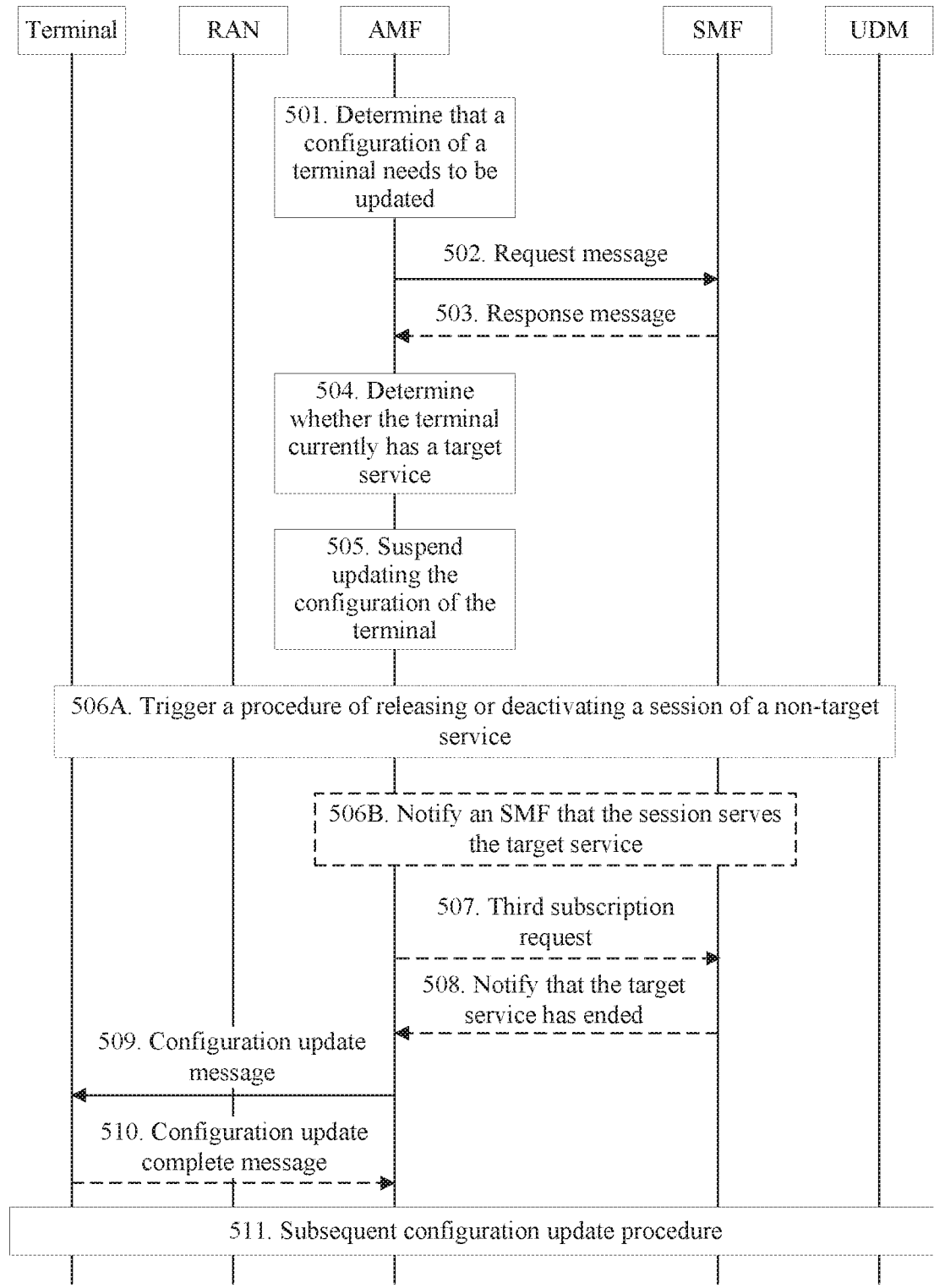
FIG. 5 is a flowchart of another configuration update method according to this application.

FIG. 5 shows a configuration update method provided in this application. The method includes the following steps.

Step 501 is the same as step 201 in the embodiment shown in FIG. 2. Refer to the foregoing descriptions.

Step 502: The AMF sends a request message to an SMF. Correspondingly, the SMF receives the request message.

The request message is used to request to query whether the terminal has a target service.

Step 503: The SMF sends a response message to the AMF, where the response message includes first indication information.

This step is an optional step. The SMF sends the response message carrying the first indication information to the AMF only when determining that the terminal has the target service.

In an implementation, if determining that the terminal has no target service, the SMF may send no response message to the AMF, or may send, to the AMF, a response message carrying indication information used to indicate that the terminal has no target service.

Step 504 to step 506B are the same as step 202 to step 204B in the embodiment shown in FIG. 2. Refer to the foregoing descriptions.

It should be noted that step 502 and step 503 may be alternatively performed before step 501. This is not limited in this application.

Step 507: The AMF sends a third subscription request to the SMF. Correspondingly, the SMF receives the third subscription request.

The third subscription request is used to notify the AMF when the target service ends.

It should be noted that step 507 may be performed in any step before step 508. Alternatively, step 507 and step 502 may be combined into one step. For example, in step 502, the request message and the third subscription request are simultaneously sent. Alternatively, the third subscription request in step 507 and the request message in step 502 are combined. For example, in step 502, only one message is sent, where the message has functions of the request message in step 502 and the third subscription request in step 507.

Step 508: If determining that the target service has ended, the SMF notifies the AMF that the target service has ended.

It should be noted that step 508 may be alternatively performed after step 505 and before step 506A, or may be performed after step 506A and before step 506B. This is not limited in this application.

Step 509 and step 510 are the same as step 205 and step 206 in the embodiment shown in FIG. 2. Refer to the foregoing descriptions.

Step 511: Perform a subsequent configuration update procedure.

Refer to a related procedure in the prior art. For example, refer to 3GPP TS 23.502: "Procedures for the 5G System; Stage 2". Details are not described herein.

Figure 6:
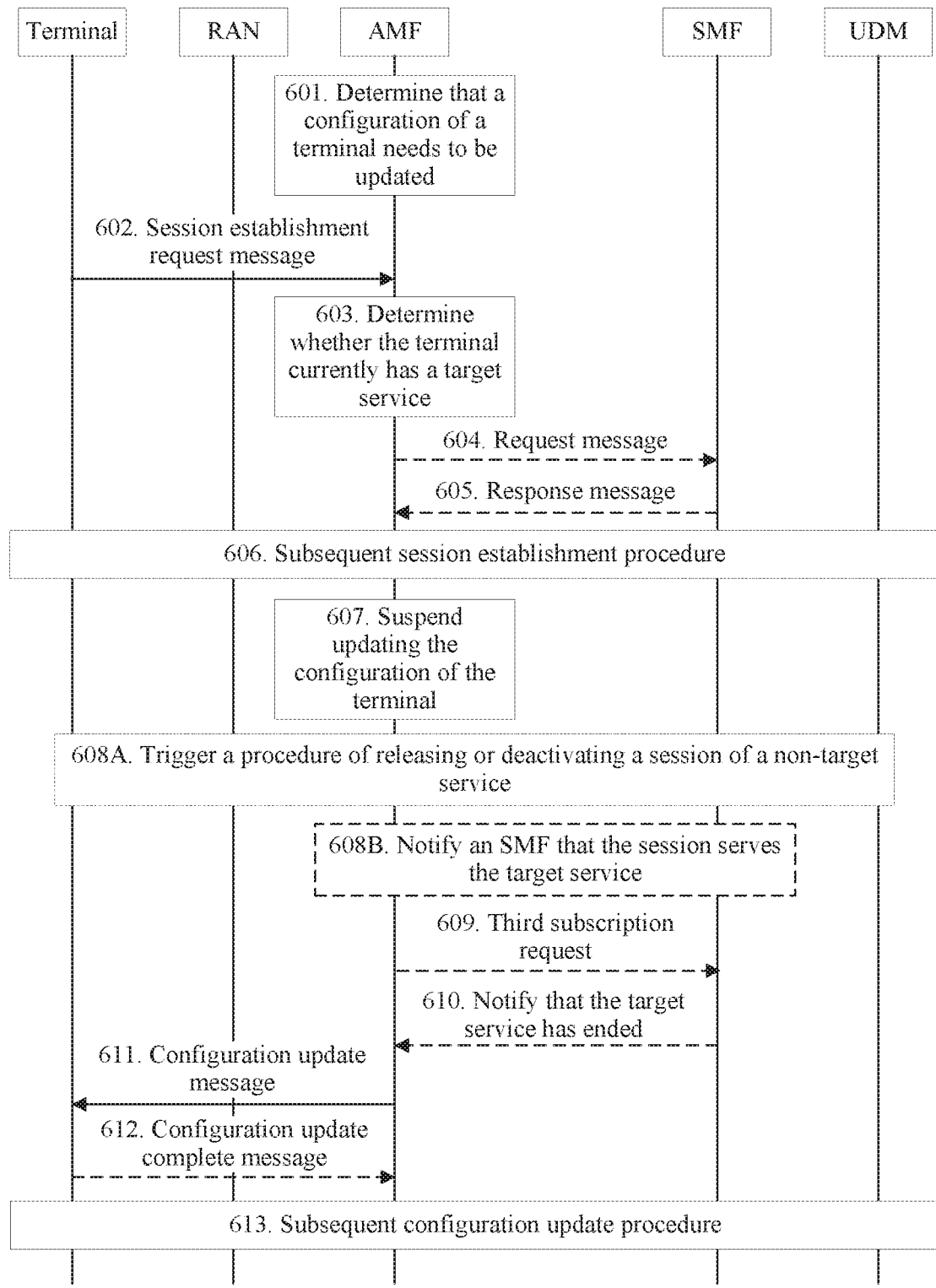
FIG. 6 is a flowchart of another configuration update method according to this application.

FIG. 6 shows a configuration update method provided in this application. The method includes the following steps.

Step 601 is the same as step 201 in the embodiment shown in FIG. 2. Refer to the foregoing descriptions.

Step 602: The terminal sends a session establishment request message to the AMF. Correspondingly, the AMF receives the session establishment request message.

When the terminal needs to initiate session establishment, the terminal may send the session establishment request message to the AMF by using a RAN device. The session establishment request message is used to request to establish a session. The session establishment request message includes information such as a request type. The request message is used to indicate a type of the to-be-established session, for example, indicate that the session requested to be established is a session of a target service or a session of a non-target service.

Step 603: The AMF determines whether the terminal has the target service.

If the request type carried in the session establishment request message indicates that the session that the terminal requests to establish is the session of the target service, the AMF determines that the terminal has the target service.

Step 604: The AMF sends a request message to an SMF. Correspondingly, the SMF receives the request message.

The request message is used to request to establish the session.

Step 605: The SMF sends a response message to the AMF. Correspondingly, the AMF receives the response message.

Step 606: Perform a subsequent session establishment procedure.

All of step 604 to step 606 are optional steps. For specific implementations, refer to a session establishment procedure in the prior art. Details are not described herein.

Step 607 to step 608B are the same as step 203 to step 204B in the embodiment shown in FIG. 2. Refer to the foregoing descriptions.

It should be noted that step 602 may be alternatively performed before step 601. This is not limited in this application.

Step 609: The AMF sends a third subscription request to the SMF. Correspondingly, the SMF receives the third subscription request.

The third subscription request is used to notify the AMF when the target service ends.

It should be noted that step 609 may be performed in any step before step 610 and after step 603.

Step 610: If determining that the target service has ended, the SMF notifies the AMF that the target service has ended.

It should be noted that step 610 may be alternatively performed after step 607 and before step 608A, or may be performed after step 608A and before step 608B. This is not limited in this application.

In an alternative implementation, step 609 and step 610 may be alternatively replaced with the following step: The SMF sends, to the AMF, a notification indicating that the session of the target service is released. Correspondingly, the AMF receives the notification. To be specific, after the session of the target service is released, the SMF proactively notifies the AMF that the session has been released, so that the AMF can learn that the target service has ended.

Step 611 and step 612 are the same as step 205 and step 206 in the embodiment shown in FIG. 2. Refer to the foregoing descriptions.

Step 613: Perform a subsequent configuration update procedure. Refer to a related procedure in the prior art. For example, refer to 3GPP TS 23.502: "Procedures for the 5G System; Stage 2". Details are not described herein.

In an alternative implementation, if the request type carried in step 602 indicates that the type of the to-be-established session is a session of a non-target service, for example, the request type is "initial request (initial request)", step 604 may be first performed after step 602, then step 605 is performed, and then step 603 is performed. In addition, the response message in step 605 may further carry QoS information. The QoS information includes an ARP and/or a 5QI. The ARP herein is used to indicate that a service corresponding to the session requested to be established is the target service. The 5QI is used to indicate that the service corresponding to the session requested to be established is the target service. Therefore, in step 603, the AMF may determine, based on the QoS information, that the terminal has the target service. Then, subsequent step 606 to step 613 are performed.

Figure 7:
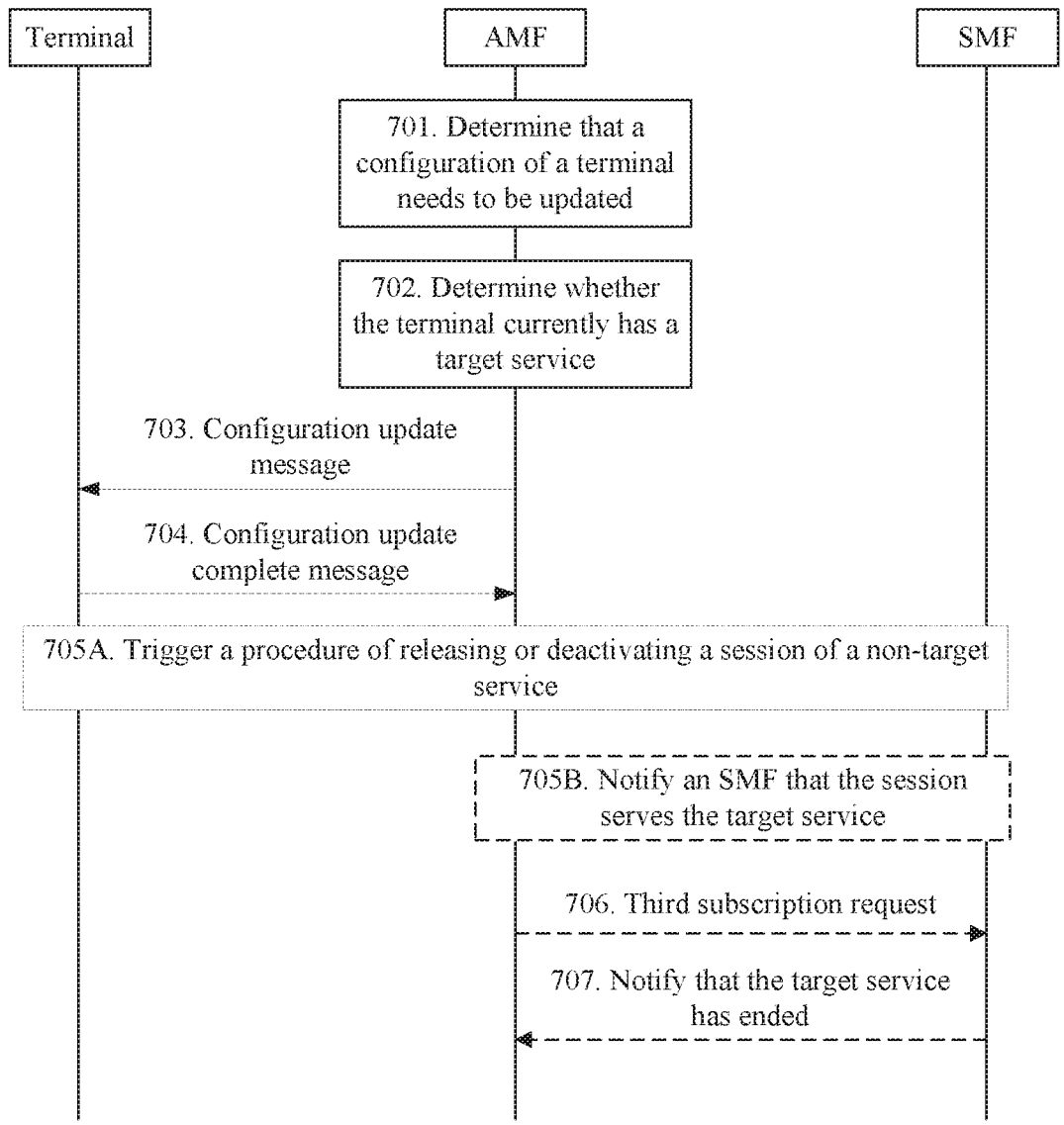
FIG. 7 is a flowchart of another configuration update method according to this application.

FIG. 7 shows another configuration update method provided in this application. The method may be used to resolve the problem mentioned in the background. An AMF in the method may be the mobility management network element shown in FIG. 1. An SMF in the method may be the session management network element shown in FIG. 1. A terminal in the method may be the terminal shown in FIG. 1. The method includes the following steps.

Step 701: The AMF determines that a configuration of the terminal needs to be updated.

For example, a method for determining, by the AMF, that the configuration of the terminal needs to be updated may be as follows: The AMF needs to change a parameter that is related to access and mobility management and that is in the configuration of the terminal, for example, a UDM network element notifies the AMF that subscription information of the terminal needs to be updated, or a network slice configuration changes.

Step 702: The AMF determines whether the terminal has a target service.

When determining that the configuration of the terminal needs to be updated, the AMF further determines whether the terminal has the target service. The target service may be a service for which service continuity needs to be ensured, namely, a service that cannot be interrupted. For example, the target service may be an emergency service, a priority service, or an IMS-based service that cannot be interrupted.

Step 703: If determining that the terminal has the target service, the AMF sends a configuration update message to the terminal, and forgoes triggering a signaling connection release procedure, where the configuration update message is used to indicate the terminal to perform a configuration update.

In the foregoing embodiment, when determining that the configuration of the terminal needs to be updated, the AMF first determines whether the terminal has the target service: and if determining that the terminal has the target service, still sends the configuration update message to the terminal. After receiving the configuration update message, the terminal merely completes configuration of the terminal, but the AMF does not trigger the signaling connection release procedure. This helps avoid interrupting execution of the target service. The AMF may wait until execution of the target service is completed and then continue to perform a subsequent procedure of a configuration update procedure. This helps ensure continuity of the target service in the configuration update procedure of the terminal.

For a method for determining, by the AMF, whether the terminal has the target service in step 702, refer to various methods in the foregoing embodiments. For example, the method of step 301 and step 302 in the embodiment shown in FIG. 3 may be used, or the method of step 401 and step 402 in the embodiment shown in FIG. 4 may be used, or the method of step 502 and step 503 in the embodiment shown in FIG. 5 may be used, or the method of step 602 in the embodiment shown in FIG. 6 may be used. For specific implementations, refer to the foregoing descriptions. Details are not described herein again.

Further, after step 703, the method may further include step 704.

Step 704: The terminal sends a configuration update complete message to the AMF.

When completing the configuration update, the terminal may send the configuration update complete message to notify the AMF that the configuration update has been completed.

Further, after step 703 or step 704, the method may further include the following step 705A and/or step 705B.

Step 705A: The AMF triggers a procedure of releasing or deactivating a session of a non-target service.

Step 705B: The AMF notifies the SMF that the session serves only the target service.

Step 705A and step 705B are the same as step 204A and step 204B in the embodiment shown in FIG. 2. Refer to the foregoing descriptions.

In another implementation, execution of step 705A is conditional. For example, in an implementation, if it is determined, in step 702, that the target service exists, and the target service is not an emergency service or a high-priority service, the AMF starts a timer, and optionally, may further add the timer to the configuration update message in step 703, and send the configuration update message to the terminal. If the timer expires and the terminal is in a connected mode, step 705A is performed. Optionally, a procedure of releasing or deactivating the session of the target service may be further performed when step 705A is being performed. If the AMF determines, before the timer expires, that an emergency service or a high-priority service of the terminal appears, the AMF stops the timer and does not perform step 705A. In other words, step 705A is performed only after the timer expires. When the configuration update message in step 703 carries the timer, if no emergency service or high-priority service of the terminal appears before the timer expires, the terminal may learn that the AMF is to perform step 705A. Optionally, when performing step 705A, the AMF may further perform the procedure of releasing or deactivating the session of the target service. If an emergency service or a high-priority service of the terminal appears before the timer expires, the terminal may stop the timer, and the terminal may learn that the AMF does not perform step 705A.

Further, after step 703 or step 704, the method may further include the following step 706 and step 707.

Step 706: The AMF sends a third subscription request to the SMF. Correspondingly, the SMF receives the third subscription request.

The third subscription request is used to notify the AMF when the target service ends.

Step 707: If determining that the target service has ended, the SMF notifies the AMF that the target service has ended.

It should be noted that the execution method described in the embodiment shown in FIG. 3, the execution method described in the embodiment shown in FIG. 4, the execution method described in the embodiment shown in FIG. 5, or the execution method described in the embodiment shown in FIG. 6 may be used as a specific implementation method of step 706 and step 707.

The following describes specific implementation for sending, by the AMF, the configuration update message to the terminal, and forgoing, by the AMF, triggering the signaling connection release procedure in step 703.

Method 1: The AMF sends third indication information to the terminal, where the third indication information is used to indicate the terminal to initiate a registration procedure after a signaling connection is released.

The third indication information may be independently sent to the terminal, or may be carried in the configuration update message to be sent to the terminal.

In the method, after receiving the configuration update message, the terminal completes the configuration update of the terminal, and then temporarily forgoes, based on the third indication information, initiating the registration procedure, but waits until the signaling connection is released and then initiates the registration procedure. Therefore, the terminal enters a waiting mode after performing the configuration update, and the terminal initiates the registration procedure only after confirming that the signaling connection is released. For example, after entering an idle mode, the terminal may confirm that the signaling connection is released. In this case, the terminal may initiate the registration procedure.

In the method, when the target service of the terminal has ended, the AMF may learn, in the manner of step 706 and step 707, that the target service of the terminal has ended. Further, the AMF may initiate the signaling connection release procedure to complete signaling connection release.

After the signaling connection is released, the terminal enters the idle mode. After the terminal enters the idle mode, it indicates that the signaling connection has been released, and then the terminal initiates the registration procedure.

Method 2: The configuration update message sent by the AMF to the terminal includes a modified configuration update parameter. A modified parameter in the configuration update parameter is a target parameter. The target parameter is a parameter that triggers signaling connection release during the configuration update.

For example, the target parameter is represented by using a parameter A. In this case, the configuration update message includes the configuration update parameter, and the configuration update parameter includes the parameter A. If the configuration update parameter is sent in a manner in the prior art, after receiving the configuration update message, the terminal is triggered, based on the parameter A in the configuration update parameter, to initiate the signaling connection release procedure.

In contrast, according to the method in this application, the parameter A is modified, so that a modified parameter A does not trigger the signaling connection release procedure. Therefore, after receiving the configuration update message, the terminal obtains the configuration update parameter from the configuration update message. Based on the modified parameter A in the configuration update parameter, the terminal does not trigger the signaling connection release procedure.

If the method 2 is used, further, if determining that the target service has ended, the AMF triggers re-performing of the configuration update procedure of the terminal. To be specific, because the configuration update of the terminal is previously triggered by using the modified configuration update parameter, the configuration update of the terminal may be not quite accurate, and after determining that the target service has ended, the AMF may trigger re-performing of the configuration update procedure of the terminal, to accurately update the configuration of the terminal.

Method 3: The AMF sends fourth indication information to the terminal, where the fourth indication information is used to indicate the terminal to initiate a registration procedure after the target service ends.

The fourth indication information may be independently sent to the terminal, or may be carried in the configuration update message to be sent to the terminal.

In the method, after receiving the configuration update message, the terminal completes the configuration update of the terminal, and then temporarily forgoes, based on the fourth indication information, initiating the registration procedure, but waits until the target service ends and then initiates the registration procedure. Therefore, the terminal enters a waiting mode after performing the configuration update, and the terminal initiates the registration procedure only after confirming that the target service ends. For example, the terminal may determine, based on that a session corresponding to the target service is released, that the target service has ended; or determine, based on that an application corresponding to the target service has been closed (for example, a socket of the application corresponding to the target service is closed), that the target service has ended. The terminal initiates the registration procedure after confirming that the target service has ended.

Method 4: The AMF sends the configuration update message to the terminal, where the configuration update message is used to indicate the terminal to initiate a registration procedure.

If determining that the target service exists, the terminal waits until the target service ends, and then initiates the registration procedure. For example, the terminal may determine, based on that a session corresponding to the target service is released, that the target service has ended; or determine, based on that an application corresponding to the target service has been closed (for example, a socket of the application corresponding to the target service is closed), that the target service has ended. The terminal initiates the registration procedure after confirming that the target service has ended.

A main difference between the method 4 and the method 3 lies in that the configuration update message in the method 4 does not carry the fourth indication information. After receiving the configuration update message, the terminal first determines, by using a predefined method, whether the terminal has the target service. If the target service exists, the terminal first initiates a registration request. The terminal initiates the registration procedure only when determining that no target service exists.

Figure 8:
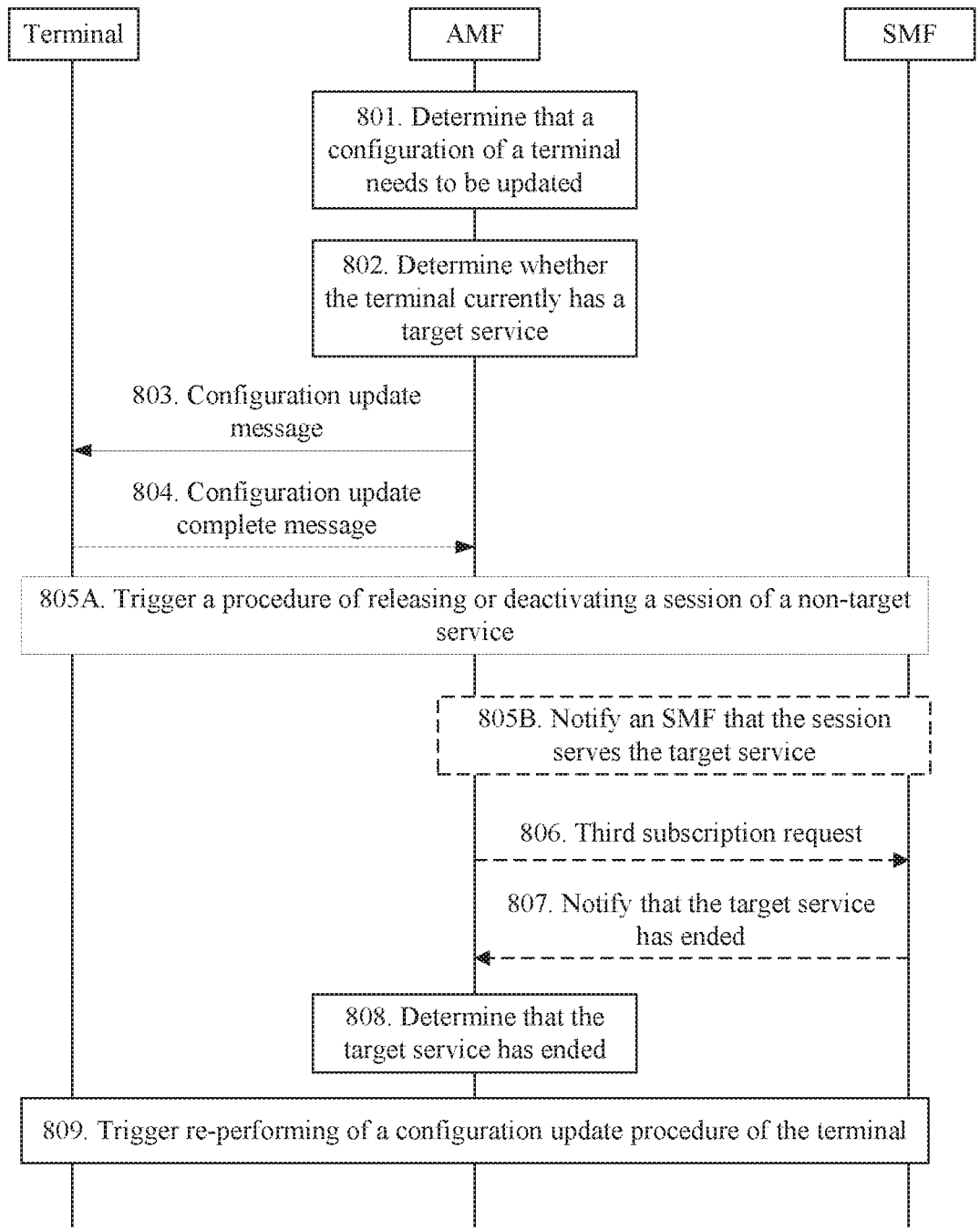
FIG. 8 is a flowchart of another configuration update method according to this application.
Figure 9:
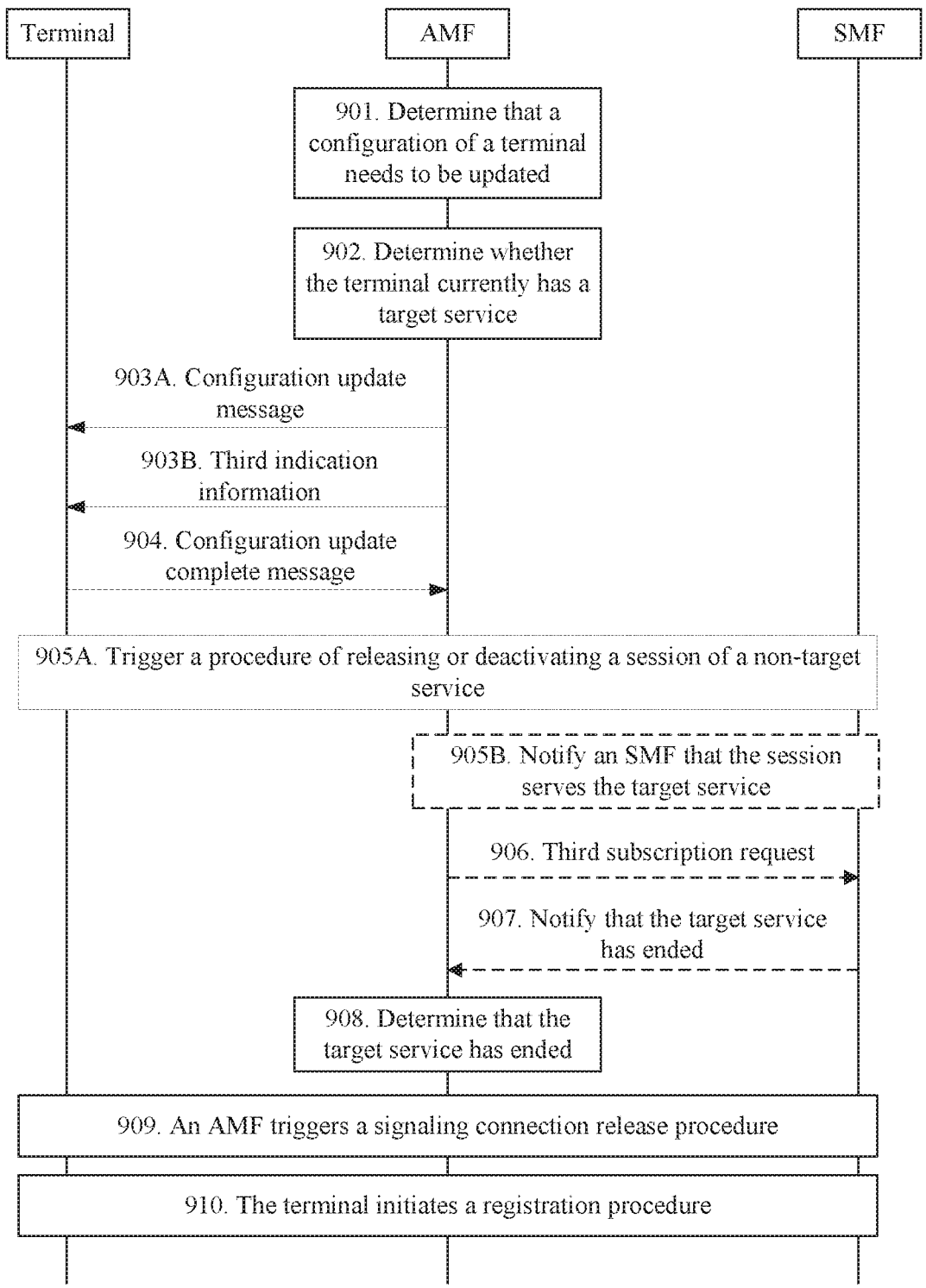
FIG. 9 is a flowchart of another configuration update method according to this application.
Figure 10:
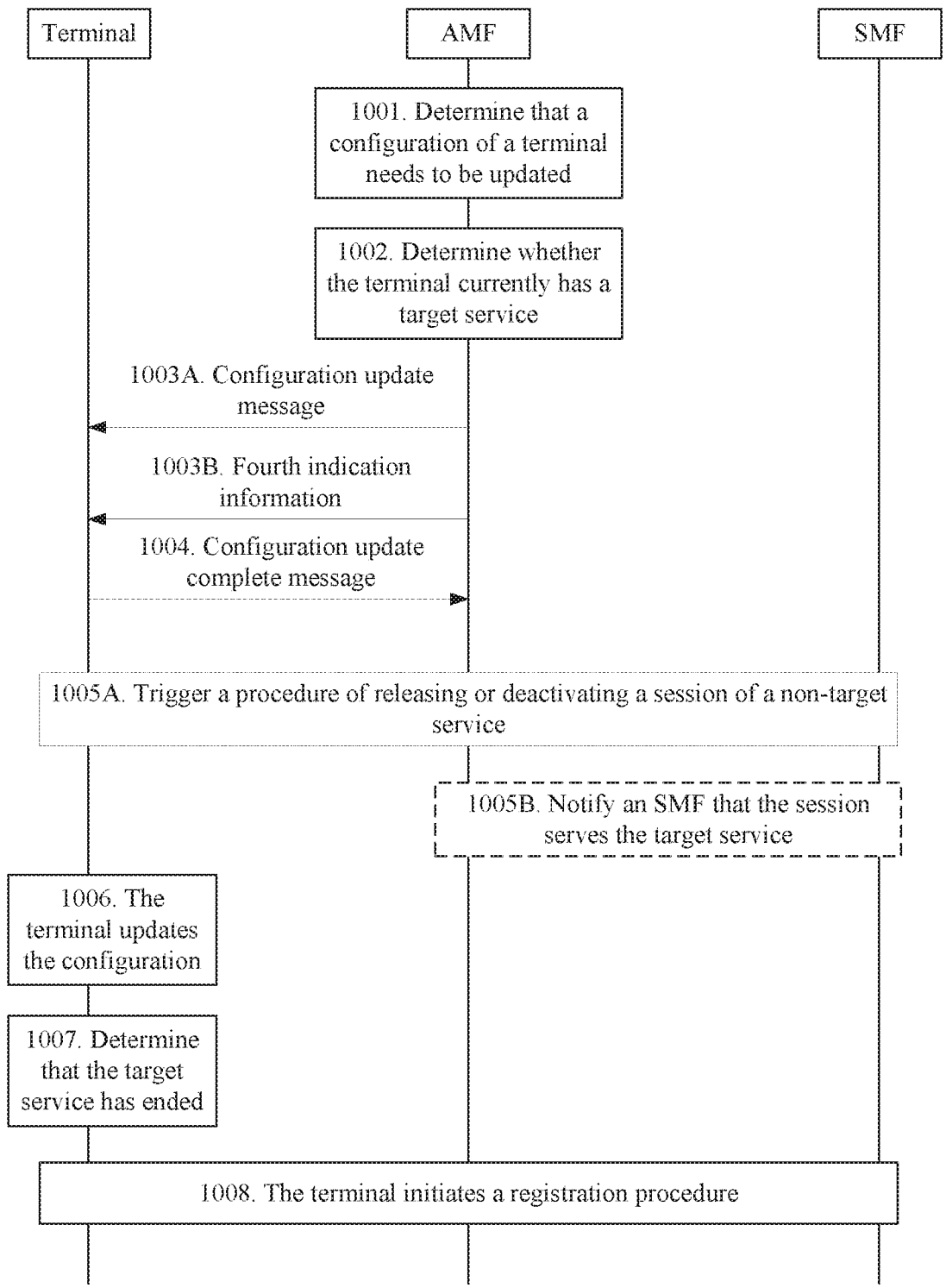
FIG. 10 is a flowchart of another configuration update method according to this application.

With reference to FIG. 8 to FIG. 10, the following specifically describes different implementations of the embodiment shown in FIG. 7.

FIG. 8 shows a configuration update method provided in this application. The method includes the following steps.

Step 801 to step 807 are the same as step 701 to step 707 in the embodiment shown in FIG. 7.

The configuration update message in step 803 is implemented by using the method 2 described in the embodiment shown in FIG. 7. To be specific, the configuration update message carries a modified configuration update parameter. A modified parameter in the configuration update parameter is a target parameter. The target parameter triggers a signaling connection release procedure before modification, but does not trigger a signaling connection release procedure after modification.

In another implementation, execution of step 805A is conditional. For example, in an implementation, if it is determined, in step 802, that the target service exists, and the target service is not an emergency service or a high-priority service, the AMF starts a timer, and optionally, may further add the timer to the configuration update message in step 803, and send the configuration update message to the terminal. If the timer expires and the terminal is in a connected mode, step 805A is performed. Optionally, a procedure of releasing or deactivating a session of the target service may be further performed when step 805A is being performed. If the AMF determines, before the timer expires, that an emergency service or a high-priority service of the terminal appears, the AMF stops the timer and does not perform step 805A. In other words, step 805A is performed only after the timer expires. When the configuration update message in step 803 carries the timer, if no emergency service or high-priority service of the terminal appears before the timer expires, the terminal may learn that the AMF is to perform step 805A. Optionally, when performing step 805A, the AMF may further perform the procedure of releasing or deactivating the session of the target service. If an emergency service or a high-priority service of the terminal appears before the timer expires, the terminal may stop the timer, and the terminal may learn that the AMF does not perform step 805A.

Step 808: The AMF determines that the target service of the terminal has ended.

To be specific, in the manner of step 806 and step 807, the AMF subscribes from the SMF, so that the SMF notifies the AMF when the target service of the terminal ends.

Step 809: The AMF triggers re-performing of a configuration update procedure of the terminal.

In this case, the terminal has no ongoing target service. Therefore, a method in the prior art may be used in step 809, to re-perform the configuration update procedure of the terminal and complete a configuration update of the terminal.

FIG. 9 shows a configuration update method provided in this application. The method includes the following steps.

Step 901 and step 902 are the same as step 701 and step 702 in the embodiment shown in FIG. 7.

Step 903A: The AMF sends a configuration update message to the terminal. Correspondingly, the terminal receives the configuration update message.

The configuration update message is the same as a configuration update message in the prior art, and is used to indicate the terminal to perform a configuration update.

Step 903B: The AMF sends third indication information to the terminal. Correspondingly, the terminal receives the third indication information.

The third indication information is used to indicate the terminal to initiate a registration procedure after a signaling connection is released.

To be specific, the third indication information is used to indicate the terminal to perform only the configuration update, and initiate the registration procedure only after the signaling connection is released. This helps ensure continuous execution of a target service.

It should be noted that step 903A and step 903B may be alternatively combined into one step, that is, the third indication information is carried in the configuration update message in step 903A. To be specific, the existing configuration update message is modified, and the third indication information is inserted into the configuration update message: or specific information in the configuration update message is modified to obtain the third indication information.

Step 904 to step 907 are the same as step 704 to step 707 in the embodiment shown in FIG. 7.

In another implementation, execution of step 905A is conditional. For example, in an implementation, if it is determined, in step 902, that the target service exists, and the target service is not an emergency service or a high-priority service, the AMF starts a timer, and optionally, may further add the timer to the configuration update message in step 903A, and send the configuration update message to the terminal. If the timer expires and the terminal is in a connected mode, step 905A is performed. Optionally, a procedure of releasing or deactivating a session of the target service may be further performed when step 905A is being performed. If the AMF determines, before the timer expires, that an emergency service or a high-priority service of the terminal appears, the AMF stops the timer and does not perform step 905A. In other words, step 905A is performed only after the timer expires. When the configuration update message in step 903A carries the timer, if no emergency service or high-priority service of the terminal appears before the timer expires, the terminal may learn that the AMF is to perform step 905A. Optionally, when performing step 905A, the AMF may further perform the procedure of releasing or deactivating the session of the target service. If an emergency service or a high-priority service of the terminal appears before the timer expires, the terminal may stop the timer, and the terminal may learn that the AMF does not perform step 905A.

Step 908: The AMF determines that the target service of the terminal has ended.

To be specific, in the manner of step 906 and step 907, the AMF subscribes from the SMF, so that the SMF notifies the AMF when the target service of the terminal ends.

Step 909: The AMF triggers a signaling connection release procedure.

To be specific, the AMF triggers the signaling connection release procedure when determining that the target service of the terminal has ended. In this case, because the target service has ended, signaling connection release does not break execution of the target service.

Step 910: The terminal initiates the registration procedure.

Because the AMF has completed signaling connection release, the terminal enters an idle mode, and the terminal may further determine that the signaling connection has been released, and therefore initiate the registration procedure, to register an updated configuration of the terminal with a network.

FIG. 10 shows another configuration update method provided in this application. The method includes the following steps.

Step 1001 and step 1002 are the same as step 901 and step 902 in the embodiment shown in FIG. 9.

Step 1003A: The AMF sends a configuration update message to the terminal. Correspondingly, the terminal receives the configuration update message.

The configuration update message is the same as a configuration update message in the prior art, and is used to indicate the terminal to perform a configuration update.

Step 1003B: The AMF sends fourth indication information to the terminal. Correspondingly, the terminal receives the fourth indication information.

The fourth indication information is used to indicate the terminal to initiate a registration procedure after a target service ends.

To be specific, the fourth indication information is used to indicate the terminal to initiate the registration procedure only after confirming that the target service has ended. This helps ensure continuous execution of the target service.

In an implementation, step 1003A and step 1003B may be alternatively combined into one step, that is, the foregoing indication information is carried in the configuration update message in step 1003A. To be specific, the existing configuration update message is modified, and the indication information is inserted into the configuration update message; or specific information in the configuration update message is modified to obtain the indication information.

In another implementation, step 1003B may be alternatively omitted, and the configuration update message in step 1003A may be further used to indicate the terminal to initiate a registration procedure.

Step 1004 to step 1005B are the same as step 904 to step 905B in the embodiment shown in FIG. 9.

In another implementation, execution of step 1005A is conditional. For example, in an implementation, if it is determined, in step 1002, that the target service exists, and the target service is not an emergency service or a high-priority service, the AMF starts a timer, and optionally, may further add the timer to the configuration update message in step 1003A, and send the configuration update message to the terminal. If the timer expires and the terminal is in a connected mode, step 1005A is performed. Optionally, a procedure of releasing or deactivating a session of the target service may be further performed when step 1005A is being performed. If the AMF determines, before the timer expires, that an emergency service or a high-priority service of the terminal appears, the AMF stops the timer and does not perform step 1005A. In other words, step 1005A is performed only after the timer expires. When the configuration update message in step 1003A carries the timer, if no emergency service or high-priority service of the terminal appears before the timer expires, the terminal may learn that the AMF is to perform step 1005A. Optionally, when performing step 1005A, the AMF may further perform the procedure of releasing or deactivating the session of the target service. If an emergency service or a high-priority service of the terminal appears before the timer expires, the terminal may stop the timer, and the terminal may learn that the AMF does not perform step 1005A.

Step 1006: The terminal updates the configuration based on the configuration update message.

To be specific, the terminal updates the configuration of the terminal based on a related parameter in the configuration update message.

Step 1007: The terminal determines that the target service has ended.

For example, the terminal determines, based on that a session corresponding to the target service is released, that the target service has ended. Alternatively, the terminal determines, based on that an application corresponding to the target service has been closed, that the target service has ended.

It should be noted that there is no strict execution sequence between step 1006 and step 1007. To be specific, step 1006 may be performed before step 1007, or step 1007 may be performed before step 1006.

Step 1008: The terminal initiates the registration procedure.

The terminal may register an updated configuration of the terminal with a network by initiating the registration procedure.

In the foregoing method, when the configuration of the terminal needs to be updated, if determining that the terminal has the target service, the AMF still sends the configuration update message to the terminal. In addition, the configuration update message carries the indication information. The indication information is used to indicate the terminal to initiate the registration procedure after determining that the target service ends. In other words, the terminal proactively initiates the registration procedure after determining that the target service ends. Because the terminal initiates the registration procedure after the target service ends, normal execution of the target service is not affected. This helps ensure continuity of the target service.

Figure 11:
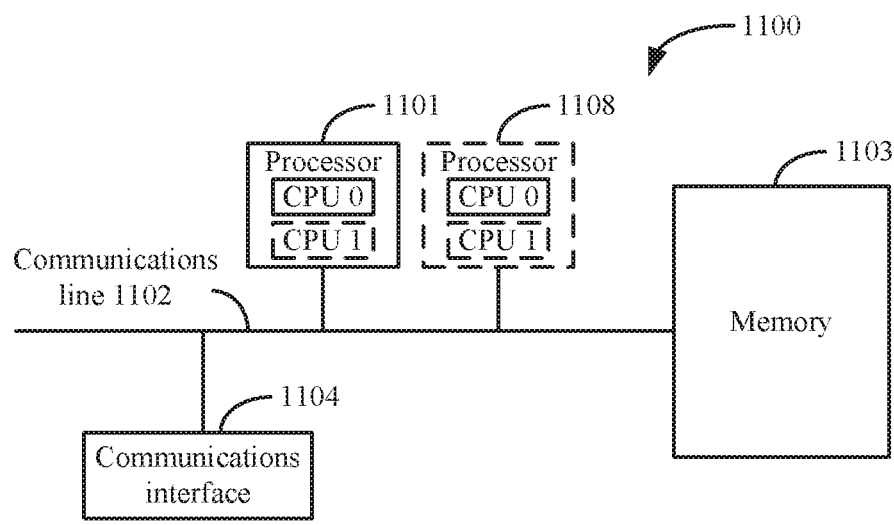
FIG. 11 is a schematic diagram of an apparatus according to this application.

Based on a same inventive idea, FIG. 11 is a schematic diagram of an apparatus provided in this application. The apparatus may be a mobility management network element or a chip, and may perform the method in any one of the foregoing embodiments.

The apparatus 1100 includes at least one processor 1101, a communications line 1102, a memory 1103, and at least one communications interface 1104.

The processor 1101 may be a general-purpose central processing unit (central processing unit, CPU), a microprocessor, an application specific integrated circuit (application specific integrated circuit, ASIC), or one or more integrated circuits configured to control execution of a program of the solutions of this application.

The communications line 1102 may include a channel for transmitting information between the foregoing components.

The communications interface 1104 is configured to communicate, by using any apparatus like a transceiver, with another device or a communications network, such as an Ethernet network, a radio access network (radio access network, RAN), a wireless local area networks (wireless local area networks. WLAN), or a wired access network.

The memory 1103 may be a read-only memory (read-only memory, ROM), another type of static storage device that can store static information and an instruction, a random access memory (random access memory, RAM), or another type of dynamic storage device that can store information and an instruction; or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 1103 is not limited thereto. The memory may exist independently, and be connected to the processor by using the communications line 1102. Alternatively, the memory may be integrated with the processor.

The memory 1103 is configured to store a computer executable instruction for executing the solutions of this application, and the processor 1101 controls execution of the computer executable instruction. The processor 1101 is configured to execute the computer executable instruction stored in the memory 1103, so as to implement the configuration update method provided in the foregoing embodiments of this application.

Optionally, the computer executable instruction in this embodiment of this application may also be referred to as application program code. This is not specifically limited in this embodiment of this application.

During specific implementation, in an embodiment, the processor 1101 may include one or more CPUs, for example, a CPU 0 and a CPU 1 in FIG. 11.

During specific implementation, in an embodiment, the apparatus 1100 may include a plurality of processors, for example, the processor 1101 and a processor 1108 in FIG. 11. Each of these processors may be a single-core (single-CPU) processor, or may be a multi-core (multi-CPU) processor. The processor herein may be one or more devices, circuits, and/or processing cores used to process data (such as a computer program instruction).

When the apparatus shown in FIG. 11 is a chip, for example, the apparatus may be a chip of a mobility management network element, the chip includes the processor 1101 (the chip may further include the processor 1108), the communications line 1102, the memory 1103, and the communications interface 1104. Specifically, the communications interface 1104 may be an input interface, a pin, a circuit, or the like. The memory 1103 may be a register, a cache, or the like. The processor 1101 and the processor 1108 each may be a general-purpose CPU, a microprocessor, an ASIC, or one or more integrated circuits configured to control execution of a program of the configuration update method in any one of the foregoing embodiments.

Figure 12:
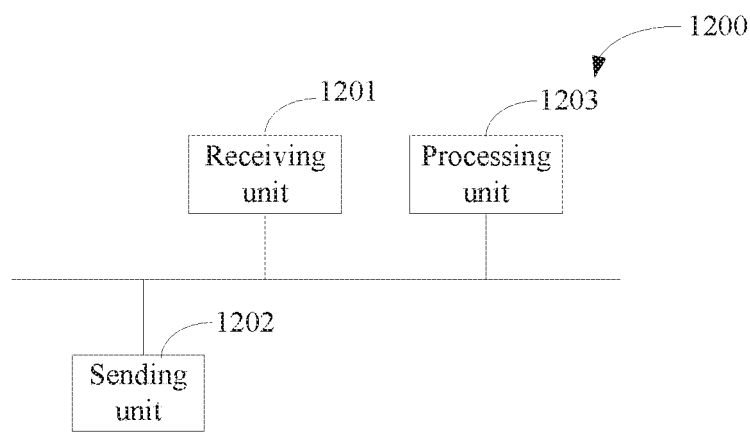
FIG. 12 is a schematic diagram of an apparatus according to this application.

In this application, functional modules in the apparatus may be obtained through division based on the foregoing method examples. For example, functional modules may be obtained through division in one-to-one correspondence with functions, or two or more functions may be integrated into one processing module. The integrated module may be implemented in a form of hardware, or may be implemented in a form of a functional module of software. It should be noted that module division in this application is an example, and is merely logical function division. Other division manners may be used during actual implementation. For example, when the functional modules are obtained through division in one-to-one correspondence with the functions. FIG. 12 is a schematic diagram of an apparatus. The apparatus 1200 may be the mobility management network element in the foregoing embodiments, or may be a chip in the mobility management network element. The apparatus 1200 includes a receiving unit 1201, a sending unit 1202, and a processing unit 1203.

In an implementation, the apparatus 1200 may implement the following operations:

The processing unit 1203 is configured to: if it is determined that a configuration of a terminal needs to be updated, determine whether the terminal has a target service. The sending unit 1202 is configured to: if it is determined that the terminal has the target service, send a configuration update message to the terminal, and forgo triggering a signaling connection release procedure, where the configuration update message is used to indicate the terminal to perform a configuration update.

In an implementation, the processing unit 1203 is specifically configured to determine, according to the following method, that the terminal has the target service: determining, based on first indication information, that the terminal has the target service, where the first indication information is used to indicate that the terminal has the target service.

In an implementation, the sending unit 1202 is further configured to send a first subscription request to a session management network element, where the first subscription request is used to send the first indication information to the apparatus 1200 when the terminal has the target service.

In an implementation, the sending unit 1202 is further configured to send a second subscription request to a session management network element, where the second subscription request is used to send a notification to the apparatus 1200 when the terminal has the target service. The receiving unit 1201 is configured to receive the notification. The processing unit 1203 is further configured to generate the first indication information based on the notification received by the receiving unit 1201.

In an implementation, the sending unit 1202 is further configured to send a request message to a session management network element, where the request message is used to request to query whether the terminal has the target service. The receiving unit 1201 is configured to receive a response message from the session management network element, where the response message includes the first indication information.

In an implementation, the receiving unit 1201 is configured to receive a session establishment request message from the terminal, where the session establishment request message includes second indication information, and the second indication information is used to indicate that an established session is a session of the target service. The processing unit 1203 is further configured to determine, according to the following method, that the terminal has the target service: determining, based on the second indication information, that the terminal has the target service.

In an implementation, the sending unit 1202 is further configured to send third indication information to the terminal, where the third indication information is used to indicate the terminal to initiate a registration procedure after a signaling connection is released.

In an implementation, the sending unit 1202 is further configured to trigger the signaling connection release procedure if it is determined that the target service has ended.

In an implementation, the processing unit 1203 is specifically configured to modify a target parameter in a configuration update parameter, where the target parameter is a parameter that triggers signaling connection release during the configuration update. The sending unit 1202 is further configured to send, to the terminal, the configuration update message carrying a modified configuration update parameter.

In an implementation, the sending unit 1202 is further configured to: if it is determined that the target service has ended, trigger re-performing of a configuration update procedure of the terminal.

In an implementation, the sending unit 1202 is further configured to send a third subscription request to the session management network element, where the third subscription request is used to notify the apparatus 1200 when the target service ends.

In an implementation, the processing unit 1203 is further configured to: if it is determined that the session of the target service has been released, determine that the target service ends.

In an implementation, the sending unit 1202 is further configured to send fifth indication information to another mobility management network element, where the fifth indication information is used to notify the another mobility management network element that the configuration update of the terminal has not been completed yet, and the another mobility management network element is a mobility management network element that serves the terminal after switching.

In an implementation, the sending unit 1202 may be further configured to send sixth indication information to the another mobility management network element, where the sixth indication information is used to indicate the another mobility management network element to send a fourth subscription request to the session management network element, and the fourth subscription request is used to request to notify the another mobility management network element when the target service ends.

In another implementation, the apparatus 1200 may implement the following operations:

the processing unit 1203 is configured to: if it is determined that a configuration of a terminal needs to be updated, determine whether the terminal has a target service; and if it is determined that the terminal has the target service, suspend updating the configuration of the terminal.

In an implementation, the sending unit 1202 is configured to trigger a procedure of releasing or deactivating a session of a non-target service; or configured to notify a session management network element that a session serves the target service.

In an implementation, the sending unit 1202 is configured to: if it is determined that the target service of the terminal has ended, send a configuration update message to the terminal, where the configuration update message is used to indicate the terminal to perform a configuration update.

In an implementation, the sending unit 1202 is further configured to send a third subscription request to the session management network element, where the third subscription request is used to notify the apparatus 1200 when the target service ends.

In an implementation, the processing unit 1203 is further configured to: if it is determined that the session of the target service has been released, determine that the target service ends.

In an implementation, the sending unit 1202 is further configured to send fifth indication information to another mobility management network element, where the fifth indication information is used to notify the another mobility management network element that the configuration update of the terminal has not been completed yet, and the another mobility management network element is a mobility management network element that serves the terminal after switching.

In an implementation, the sending unit 1202 may be further configured to send sixth indication information to the another mobility management network element, where the sixth indication information is used to indicate the another mobility management network element to send a fourth subscription request to the session management network element, and the fourth subscription request is used to request to notify the another mobility management network element when the target service ends.

It should be understood that the apparatus 1200 may be configured to implement the steps performed by the mobility management network element in the methods in the embodiments of the present invention. For related features, refer to the foregoing descriptions. Details are not described herein again.

Specifically, functions/implementation processes of the receiving unit 1201, the processing unit 1203, and the sending unit 1202 in FIG. 12 may be implemented by the processor 1101 in FIG. 11 by invoking the computer executable instruction stored in the memory 1103. Alternatively, a function/an implementation process of the processing unit 1203 in FIG. 12 may be implemented by the processor 1101 in FIG. 11 by invoking the computer executable instruction stored in the memory 1103; and functions/implementation processes of the receiving unit 1201 and the sending unit 1202 in FIG. 12 may be implemented by the communications interface 1104 in FIG. 11.

Optionally, when the apparatus 1200 is a chip or a circuit, the functions/implementation processes of the receiving unit 1201 and the sending unit 1202 may be alternatively implemented by a pin, a circuit, or the like. Optionally, when the apparatus 1200 is a chip, the memory 1203 may be a storage unit in the chip, for example, a register or a cache. Certainly, when the apparatus 1200 is a mobility management network element, the memory 1203 may be a storage unit that is in the mobility management network element and that is outside a chip. This is not specifically limited in this embodiment of this application.

In any one of the embodiments shown in FIG. 2 to FIG. 9, if mobility of the terminal results in AMF switching, a switched-from AMF (for example, referred to as an AMF 1) may notify a switched-to AMF (for example, referred to as an AMF 2) that the configuration update of the terminal has not been completed yet. Then, operations to be subsequently performed by the switched-from AMF may be performed by the switched-to AMF instead, or may be jointly performed by the switched-from AMF and the switched-to AMF. The switched-from AMF 1 is an AMF that serves the terminal before the switching, and the switched-to AMF 2 is an AMF that serves the terminal after the switching.

By using FIG. 2 and FIG. 3 as examples, the following extends the embodiments shown in FIG. 2 and FIG. 3 to an AMF switching scenario. The embodiments shown in FIG. 4 to FIG. 10 may also be extended to an AMF switching scenario according to a same method, and details are not described again.

Figure 13:
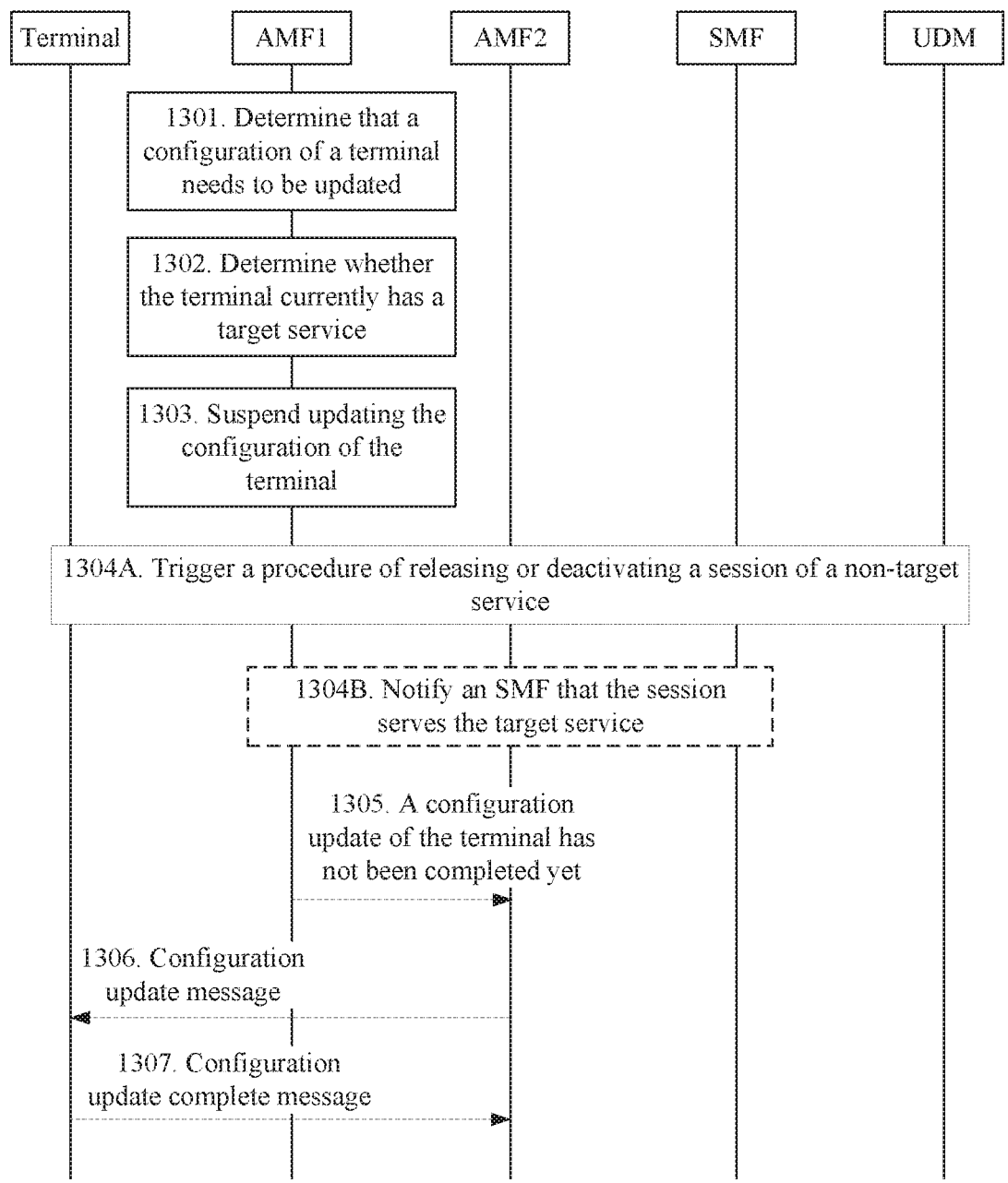
FIG. 13 is a flowchart of another configuration update method according to this application.

FIG. 13 shows a configuration update method provided in this application. The method is specific to a case in which the embodiment shown in FIG. 2 is extended to an AMF switching scenario. An AMF 1 in the embodiment shown in FIG. 13 is a switched-from AMF, namely, the AMF shown in FIG. 2. An AMF 2 shown in FIG. 13 is a switched-to AMF. The method includes the following steps.

Step 1301 to step 1304B are the same as step 201 to step 204B in the embodiment shown in FIG. 2. Refer to the foregoing descriptions. Details are not described herein again.

Step 1305: The AMF 1 notifies the AMF 2 that the configuration update of the terminal has not been completed yet.

During the configuration update of the terminal, if movement of the terminal triggers switching of a mobility management network element serving the terminal from the AMF 1 to the AMF 2, the AMF 1 may notify the AMF 2 that the configuration update of the terminal has not been completed yet.

In an implementation, the AMF 1 may send indication information to the AMF 2. The indication information is used to notify the AMF 2 that the configuration update of the terminal has not been completed yet. The indication information may be independently sent, or may be included in context information of the terminal sent by the AMF 1 to the AMF 2. The indication information herein may be referred to as fifth indication information.

Further, after step 1305, the method may further include the following step 1306.

Step 1306: If determining that the target service of the terminal has ended, the AMF 2 sends a configuration update message to the terminal, where the configuration update message is used to indicate the terminal to perform the configuration update. Correspondingly, the terminal receives the configuration update message.

Further, after step 1306, the method may further include the following step 1307.

Step 1307: The terminal sends a configuration update complete message to the AMF 2. Correspondingly, the AMF 2 receives the configuration update complete message.

For specific implementation details of step 1306 and step 1307, refer to step 205 and step 206 shown in FIG. 2. Details are not described herein again. A main difference between step 1306 and step 1307, and step 205 and step 206 lies in that an execution body changes from the AMF 1 to the AMF 2.

In the foregoing embodiment, when determining that the configuration of the terminal needs to be updated, the AMF 1 first determines whether the terminal has the target service: and if determining that the terminal has the target service, suspends updating the configuration of the terminal. This helps avoid interrupting execution of the target service. If AMF switching occurs, and the terminal switches from the AMF 1 to the AMF 2, the AMF 1 may notify the AMF 2 that the configuration update of the terminal has not been completed yet, so that after execution of the target service is subsequently completed, the AMF 2 can continue to update the configuration of the terminal. This helps ensure continuity of the target service in a configuration update procedure of the terminal.

Figure 14A:
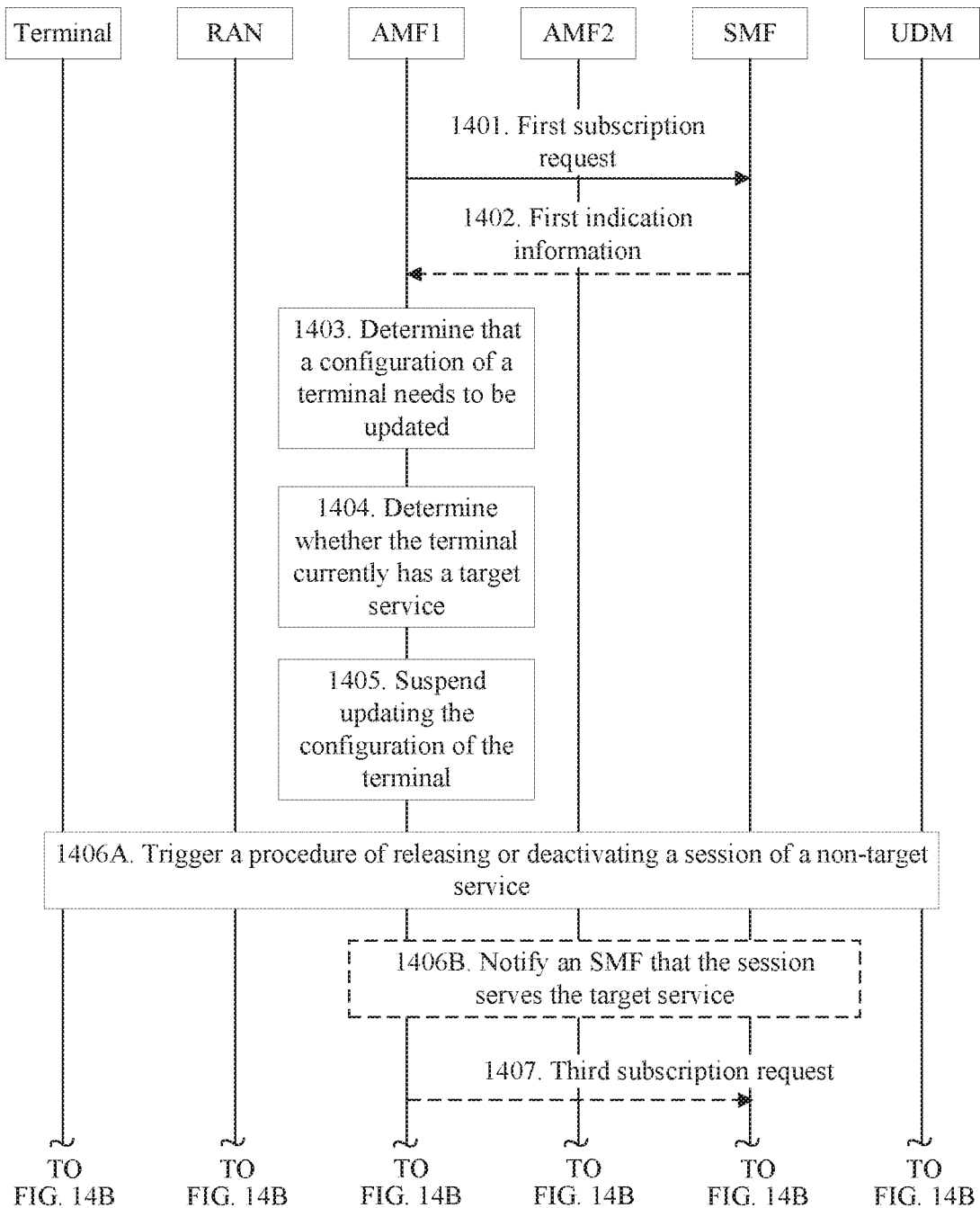
FIG. 14A and FIG. 14B are a flowchart of another configuration update method according to this application.
Figure 14B:
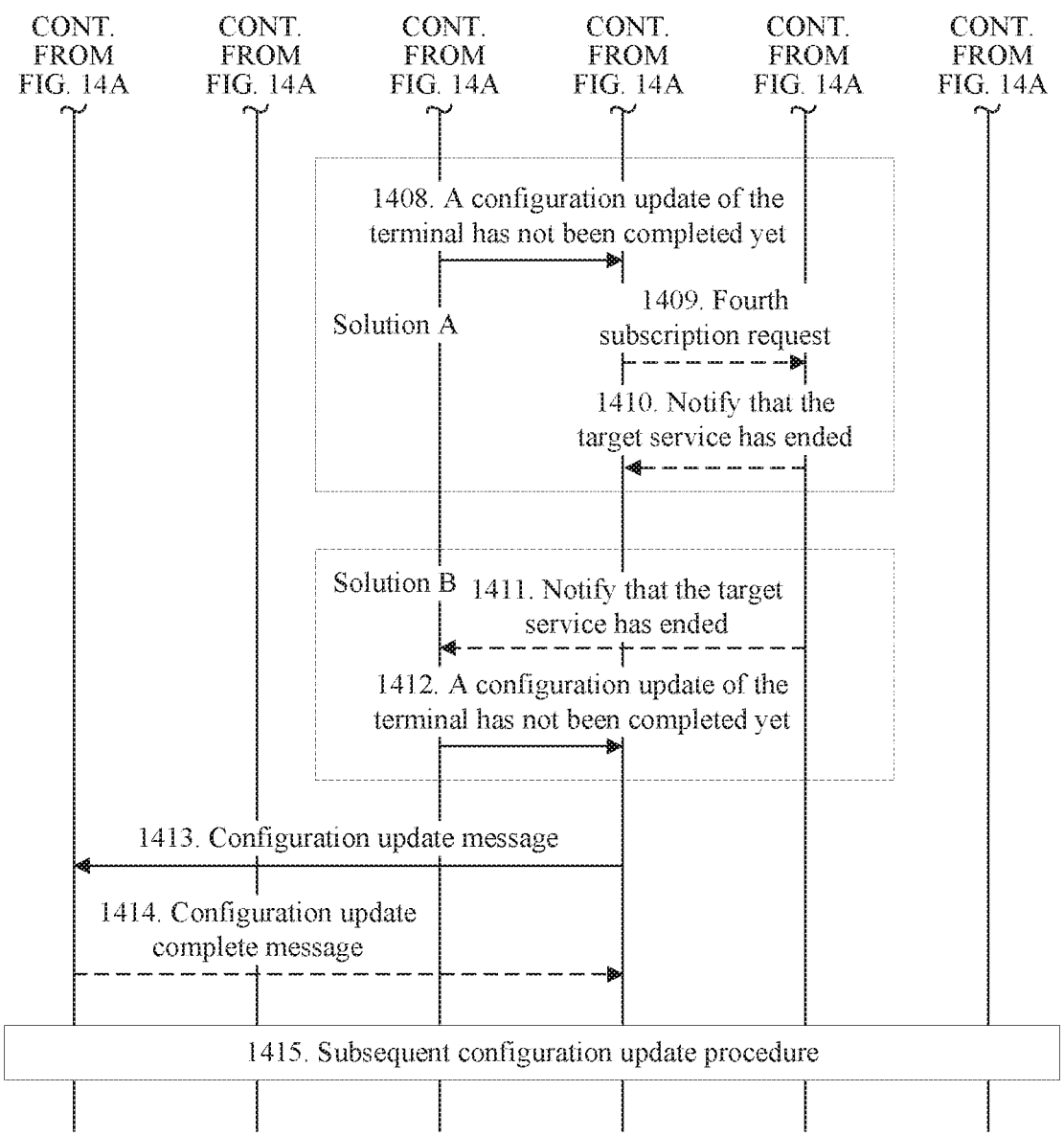

FIG. 14A and FIG. 14B show another configuration update method provided in this application. The method is specific to a case in which the embodiment shown in FIG.

3 is extended to an AMF switching scenario. An AMF 1 in the embodiment shown in FIG. 14A and FIG. 14B is a switched-from AMF, namely, the AMF shown in FIG. 3. An AMF 2 shown in FIG. 14A and FIG. 14B is a switched-to AMF. The method includes the following steps.

Step 1401 to step 1407 are the same as step 301 to step 307 in the embodiment shown in FIG. 3. Refer to the foregoing descriptions. Details are not described herein again.

During the configuration update of the terminal, if movement of the terminal triggers switching of a mobility management network element serving the terminal from the AMF 1 to the AMF 2, the AMF 1 may notify the AMF 2 that the configuration update of the terminal has not been completed yet.

In this embodiment of this application, specific methods for notifying, by the AMF 1, the AMF 2 that the configuration update of the terminal has not been completed yet may include at least the following two solutions, which are separately described below:

Solution A: In a process of waiting, by the AMF 1, to receive a target service end notification, the AMF 1 notifies the AMF 2 that the configuration update of the terminal has not been completed yet. In other words, when the AMF 1 notifies the AMF 2 that the configuration update of the terminal has not been completed yet, the AMF 1 has not received a notification that is sent by the SMF and that indicates that the target service has ended. For example, the solution A may be implemented by performing the following step 1408 to step 1410.

Step 1408: The AMF 1 notifies the AMF 2 that the configuration update of the terminal has not been completed yet.

In an implementation, the AMF 1 may send fifth indication information to the AMF 2. The fifth indication information is used to notify the AMF 2 that the configuration update of the terminal has not been completed yet. Optionally, in step 1408, the AMF 1 may further send sixth indication information while sending the fifth indication information. The sixth indication information is used to indicate the AMF 2 to send a fourth subscription request to the SMF. The fourth subscription request is used to request to notify the AMF 2 when the target service ends. After receiving the sixth indication information, the AMF 2 performs the following step 1409. In other words, the sixth indication information may be used to trigger the AMF 2 to send the fourth subscription request to the SMF. Alternatively, the AMF 1 may send only the fifth indication information and does not send the sixth indication information. After receiving the fifth indication information, the AMF 2 determines that the configuration update of the terminal has not been completed yet, and further continues to perform step 1409. The fifth indication information may be independently sent, or may be included in context information of the terminal sent by the AMF 1 to the AMF 2. If the sixth indication information is sent, the sixth indication information may be independently sent, or may be included in the context information of the terminal sent by the AMF 1 to the AMF 2.

For example, the following provides specific implementation of the sixth indication information.

Method 1: The sixth indication information may include related information of the third subscription request. In this case, after receiving the related information of the third subscription request, the AMF 2 may determine that the configuration update of the terminal has not been completed yet, and may further trigger the AMF 2 to perform the following step 1409.

Method 2: The sixth indication information may include before-update configuration information of the terminal and updated configuration information of the terminal. After receiving the information, if determining that the before-update configuration information of the terminal is different from the updated configuration information of the terminal, the AMF 2 may determine that the configuration update of the terminal is not completed, and may further trigger the AMF 2 to perform the following step 1409.

Method 3: The sixth indication information may be one-bit indication information. For example, when the sixth indication information is "0", the sixth indication information is used to indicate the AMF 2 to send the fourth subscription request to the SMF, that is, trigger the AMF 2 to perform the following step 1409; or when the sixth indication information is "1", the sixth indication information is used to indicate the AMF 2 to send the fourth subscription request to the SMF.

It should be noted that if the terminal sends a PDU session establishment request to the AMF 2 in this case, the AMF 2 may reject the PDU session establishment request, and return a rejection response to the terminal. Optionally, the rejection response may further include a reason for rejection.

Step 1409: The AMF 2 sends the fourth subscription request to the SMF.

The fourth subscription request is used to request to notify the AMF 2 when the target service ends.

In an implementation, after step 1409, the SMF may further indicate the AMF 1 to cancel the third subscription request. That is, that the AMF 1 subscribes to the target service end notification is modified to that the AMF 2 subscribes to the target service end notification.

Step 1410: If determining that the target service has ended, the SMF notifies the AMF 2 that the target service has ended.

According to step 1408 to step 1410, when receiving no notification indicating that the target service has ended, the AMF 1 does not continue to wait, but directly notifies, by performing step 1408, the AMF 2 that the configuration update of the terminal has not been completed yet; and further triggers the AMF 2 to continue to subscribe to the target service end notification from the SMF, that is, triggers the AMF 2 to send the fourth subscription request to the SMF by performing step 1409. Therefore, if subsequently determining that the target service has ended, the SMF directly notifies the AMF 2.

Solution B: After receiving the target service end notification, the AMF 1 notifies the AMF 2 that the configuration update of the terminal has not been completed yet. For example, the solution B may be implemented by performing the following step 1411 and step 1412.

Step 1411: If determining that the target service has ended, the SMF notifies the AMF 1 that the target service has ended.

Step 1411 is the same as step 308 shown in FIG. 3. Refer to the foregoing descriptions.

Step 1412: The AMF 1 notifies the AMF 2 that the configuration update of the terminal has not been completed yet.

In an implementation, the AMF 1 may send fifth indication information to the AMF 2. The fifth indication information is used to notify the AMF 2 that the configuration update of the terminal has not been completed yet.

In another implementation, in step 1408, the AMF 1 may further send, to the AMF 2, before-update configuration information of the terminal and updated configuration information of the terminal. After receiving the information, if determining that the before-update configuration information of the terminal is different from the updated configuration information of the terminal, the AMF 2 may determine that the configuration update of the terminal is not completed.

According to step 1411 and step 1412, when receiving no notification indicating that the target service has ended, the AMF 1 continues to wait until receiving, by performing step 1411, the notification indicating that the target service has ended, and then notifies, by performing step 1412, the AMF 2 that the configuration update of the terminal has not been completed yet, and therefore the AMF 2 does not need to be triggered to subscribe, from the SMF, the notification indicating that the target service has ended.

After step 1408 to step 1410, or after step 1411 and step 1412, the method may further include the following step 1413 to step 1415.

Step 1413 and step 1414 are the same as step 1306 and step 1307 in the embodiment shown in FIG. 13. Refer to the foregoing descriptions. Details are not described herein again.

Step 1415: Perform a subsequent configuration update procedure. Refer to a related procedure in the prior art. For example, refer to 3GPP TS 23.502: "Procedures for the 5G System; Stage 2". Details are not described herein.

In the foregoing embodiment, when determining that the configuration of the terminal needs to be updated, the AMF 1 first determines whether the terminal has the target service; and if determining that the terminal has the target service, suspends updating the configuration of the terminal. This helps avoid interrupting execution of the target service. If AMF switching occurs, and the terminal switches from the AMF 1 to the AMF 2, the AMF 1 may notify the AMF 2 that the configuration update of the terminal has not been completed yet, so that after execution of the target service is subsequently completed, the AMF 2 can continue to update the configuration of the terminal. This helps ensure continuity of the target service in a configuration update procedure of the terminal.

In any one of the embodiments shown in FIG. 2 to FIG. 6, if the UDM network element (referred to as UDM below) triggers the AMF to update the configuration of the terminal, when the AMF determines that the target service exists and therefore suspends updating the configuration of the terminal, the AMF may further notify the UDM that the configuration update fails or the configuration update is suspended, so that the UDM can continue to wait or re-initiate the configuration update procedure. By using FIG. 2 as an example, the following extends the embodiment shown in FIG. 2 to an application scenario in which the UDM is notified of a configuration update result. The embodiments shown in FIG. 3 to FIG. 6 may also be extended, according to a same method, to an application scenario in which the UDM is notified of a configuration update result, and details are not described again.

Figure 15:
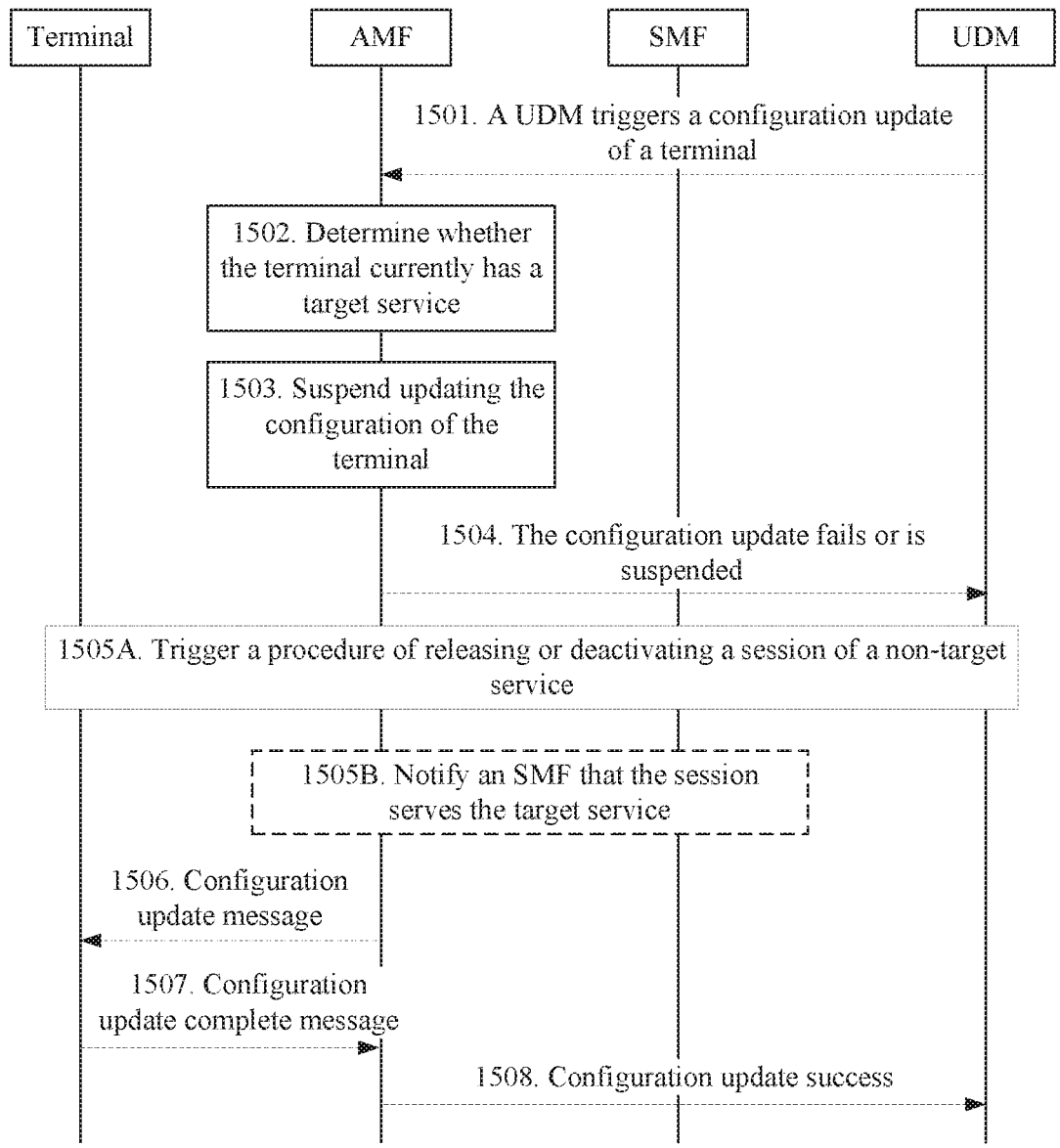
FIG. 15 is a flowchart of another configuration update method according to this application.

FIG. 15 shows a configuration update method provided in this application. The method includes the following steps.

Step 1501: UDM triggers a configuration update of a terminal.

For example, a method for triggering the configuration update of the terminal by the UDM may be: notifying, by the UDM, an AMF that subscription information of the terminal needs to be updated.

Step 1502 and step 1503 are the same as step 202 and step 203 in the embodiment shown in FIG. 2. Refer to the foregoing descriptions.

Step 1504: The AMF notifies the UDM that the configuration update is suspended or fails.

In step 1503, if determining that the terminal has a target service, the AMF suspends updating the configuration of the terminal. Then, the AMF may notify the UDM that the configuration update of the terminal is suspended or fails.

In an implementation, in step 1504, the AMF may notify the UDM that the configuration update is suspended. Further, the UDM may start a timer after receiving configuration update suspend information. If the UDM never receives a configuration update success notification in step 1508 before the timer of the UDM expires, the UDM may determine that the configuration update of the terminal fails. Optionally, a timer that is the same as that on the UDM may also be set on the AMF. If the terminal keeps having the target service, the AMF does not start the configuration update of the terminal, and the timer on the AMF expires. Therefore, the AMF may also determine that the configuration update of the terminal fails, and step 1508 is not to be performed. Further, after the UDM determines that the configuration update fails, the UDM may be triggered, based on policy information configured for the UDM, to subsequently re-initiate a configuration update of the terminal; or may start another timer, where the timer is used to trigger the UDM to subsequently re-initiate a configuration update of the terminal.

In another implementation, in step 1504, the AMF may alternatively notify the UDM that the configuration update fails. Further, after the UDM determines that the configuration update fails, the UDM may be triggered, based on policy information configured for the UDM, to subsequently re-initiate a configuration update of the terminal; or may start another timer, where the timer is used to trigger the UDM to subsequently re-initiate a configuration update of the terminal.

In an implementation, after step 1503, if determining that the configuration update fails (for example, the timer on the AMF expires), the AMF may stop performing subsequent step 1505A to step 1508. In another implementation, after step 1503, if the AMF determines, before the timer on the AMF expires, that the terminal has no target service, the AMF may continue to perform subsequent step 1505A to step 1508.

Step 1505A to step 1507 are the same as step 204A to step 206 in the embodiment shown in FIG. 2. Refer to the foregoing descriptions.

It should be noted that there is no strict execution sequence between step 1504, and step 1505A and step 1505B. To be specific, step 1504 may be performed before step 1505A and step 1505B; step 1505A and step 1505B may be performed before step 1504; step 1505A may be performed first, then step 1504 is performed, and then step 1505B is performed; or step 1505B may be performed first, then step 1504 is performed, and then step 1505A is performed.

Step 1508: The AMF notifies the UDM that the configuration update succeeds.

If completing the configuration update of the terminal, the AMF may send the configuration update success notification to the UDM.

In an implementation, if the AMF sends, before performing step 1508, the configuration update suspend information to the UDM in step 1504, the UDM is triggered to start the timer. In this case, after performing step 1508, the UDM may stop the timer if the timer on the UDM does not expire when the UDM receives the configuration update success notification. In addition, the UDM does not trigger re-initiating a configuration update of the terminal.

In another implementation, if the AMF sends, before performing step 1508, the configuration update suspend information to the UDM in step 1504, the UDM is triggered to start the timer. In this case, after performing step 1508, the UDM triggers re-initiating a configuration update of the terminal, if the timer on the UDM expires before the UDM receives the configuration update success notification.

In an implementation, when triggering re-initiating the configuration update of the terminal, the UDM may initiate the configuration update of the terminal based on a configuration that is the same as that used when the configuration update of the terminal is initiated last time. In this case, under a precondition that the terminal has no target service, if step 1505A to step 1507 have not been performed, step 1505A to step 1507 may be first performed, and then step 1508 is performed; or if step 1505A to step 1507 have been performed, step 1505A to step 1507 are not performed again, and step 1508 is directly performed.

In another implementation, when triggering re-initiating the configuration update of the terminal, the UDM may re-initiate the configuration update of the terminal based on a configuration that is different from that used when the configuration update of the terminal is initiated last time.

It should be noted that in step 1508, the AMF may send indication information to the UDM, where the indication information is used to indicate that the configuration update succeeds. The indication information may be carried in an indication message for sending, or the indication information may be a cause value in another message, or the indication information may be independently sent.

In the foregoing embodiment, when determining that the configuration of the terminal needs to be updated, the AMF first determines whether the terminal has the target service: and if determining that the terminal has the target service, suspends updating the configuration of the terminal. This helps avoid interrupting execution of the target service. The AMF may continue to update the configuration of the terminal after execution of the target service is subsequently completed. This helps ensure continuity of the target service in a configuration update procedure of the terminal. In addition, the AMF may further send the configuration update suspend information or configuration update failure information to the UDM, to trigger the UDM to re-initiate a configuration update procedure.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the one or more computer program instructions are loaded and executed on a computer, all or some of the procedures or functions according to the embodiments of the present invention are generated. The computer may be a general-purpose computer, a special-purpose computer, a computer network, or another programmable apparatus. The one or more computer instructions may be stored in a computer readable storage medium, or may be transmitted from a computer readable storage medium to another computer readable storage medium. For example, the one or more computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The various illustrative logic units and circuits described in the embodiments of this application may implement or operate the described functions by using a general purpose processor, a digital signal processor, an application-specific integrated circuit (ASIC), a field programmable gate array (FPGA) or another programmable logic apparatus, a discrete gate or transistor logic device, a discrete hardware component, or a design of any combination thereof. The general purpose processor may be a microprocessor. Optionally, the general purpose processor may be alternatively any conventional processor, controller, microcontroller, or state machine. The processor may be alternatively implemented by a combination of computing apparatuses, such as a digital signal processor and a microprocessor, a plurality of microprocessors, one or more microprocessors together with a digital signal processor core, or any other similar configuration.

Steps of the methods or algorithms described in the embodiments of this application may be directly embedded into hardware, a software unit executed by the processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to the processor, so that the processor can read information from the storage medium and write information into the storage medium. Optionally, the storage medium may be alternatively integrated into the processor. The processor and the storage medium may be disposed in an ASIC, and the ASIC may be disposed in a terminal device. Optionally, the processor and the storage medium may be alternatively disposed in different components of a terminal device.

The computer program instructions may also be loaded onto the computer or the another programmable data processing device, so that a series of operation steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely example descriptions of the present invention defined by the appended claims, and are considered as covering any or all of modifications, variations, combinations, or equivalents that are within the scope of the present invention. Obviously, a person skilled in the art can make various modifications and variations to the present invention without departing from the spirit and scope of the present invention. The present invention is intended to cover these modifications and variations of the present invention provided that these modifications and variations fall within the scope of the claims of the present invention and equivalent technologies thereof.

What is claimed is:

1. A configuration update method, comprising:
in response to receiving, from a unified data management (UDM) network element, a notification indicating that subscription information of a terminal needs to be updated, determining, by a mobility management network element, that a configuration of the terminal needs to be updated and a target service exists;
in response to the determining that the configuration of the terminal needs to be updated and that the target service exists, sending, by the mobility management network element, a configuration update message to the terminal while refraining from triggering a signaling connection release procedure, wherein the configuration update message indicates the terminal to perform a configuration update that comprises an update on the subscription information, wherein the configuration update message comprises a timer;
starting, by the mobility management network element, the timer; and
triggering, by the mobility management network element, a procedure of releasing or deactivating a session of a non-target service only after the timer expires and the terminal is in a connected mode.

2. The method according to claim 1, wherein the target service is an emergency service.

3. The method according to claim 1, wherein the determining, by a mobility management network element, whether a target service exists comprises:
determining, by the mobility management network element, whether the target service exists, based on that a session of the target service exists.

4. The method according to claim 1, wherein the method further comprises:
triggering, by the mobility management network element, the signaling connection release procedure when the mobility management network element determines that the target service ends.

5. The method according to claim 3, wherein the method further comprises:
when the mobility management network element determines that the session of the target service has been released, determining, by the mobility management network element, that the target service ends.

6. An apparatus, comprising:
a transceiver;
at least one processor; and
one or more memories coupled to the at least one processor and storing programming instructions for execution by the at least one processor to cause the apparatus to:
in response to receiving, from a unified data management (UDM) network element, a notification indicating that subscription information of a terminal needs to be updated, determine that a configuration of the terminal needs to be updated and a target service exists;
in response to the determination that the configuration of the terminal needs to be updated and that the target service exists,
refrain from triggering a signaling connection release procedure; and
send, by using the transceiver, a configuration update message to the terminal, wherein the configuration update message indicates the terminal to perform a configuration update that comprises an update on the subscription information, wherein the configuration update message comprises a timer;
start the timer; and
trigger a procedure of releasing or deactivating a session of a non-target service only after the timer expires and the terminal is in a connected mode.

7. The apparatus according to claim 6, wherein the target service is an emergency service.

8. The apparatus according to claim 6, wherein the programming instructions, when executed by the at least one processor, cause the apparatus to determine that the target service exists based on that a session of the target service exists.

9. The apparatus according to claim 6, wherein the programming instructions, when executed by the at least one processor, cause the apparatus to trigger the signaling connection release procedure when determining that the target service has ended.

10. The apparatus according to claim 8, wherein the programming instructions, when executed by the at least one processor, cause the apparatus to determine the target service ends when determining that the session of the target service has been released.

11. A configuration update method, comprising:
receiving, by a terminal, a configuration update message from a mobility management network element, wherein the configuration update message instructs the terminal to perform a configuration update and the configuration update message comprises an explicit indication that indicates the terminal to initiate a registration procedure after a target service ends, wherein the configuration update message comprises a timer;
initiating, by the terminal, the registration procedure after the target service ends;
starting, by the terminal, the timer;
determining, by the terminal, a procedure of releasing or deactivating a session of a non-target service is performed, only after the timer expires and the terminal is in a connected mode.

12. The method according to claim 11, wherein the target service is an emergency service.

13. The method according to claim 11, further comprising: determining, by the terminal, that the target service ends.

14. The method according to claim 13, wherein the determining, by the terminal, that the target service ends comprises: determining, by the terminal, that the target service ends, based on that a session of the target service is released.

15. A configuration update apparatus, comprising:
a transceiver;
at least one processor; and
one or more memories coupled to the at least one processor and storing programming instructions for execution by the at least one processor to cause the apparatus to:
receive, by using the transceiver, a configuration update message from a mobility management network element, wherein the configuration update message instructs the apparatus to perform a configuration update and the configuration update message comprises an explicit indication that indicates the apparatus to initiate a registration procedure after a target service ends, wherein the configuration update message comprises a timer;

initiate a registration procedure after the target service ends;

start the timer; and determine a procedure of releasing or deactivating a session of a non-target service is performed, only after the timer expires and the apparatus is in a connected mode.

16. The apparatus according to claim 15, wherein the target service is an emergency service.

17. The apparatus according to claim 15, wherein the programming instructions, when executed by the at least one processor, cause the apparatus to determine that the target service ends.

18. The apparatus according to claim 17, wherein the programming instructions, when executed by the at least one processor, cause the apparatus to determine that the target service has ended, based on that a session corresponding to the target service is released.

* * * * *